US010881991B2

(12) United States Patent
Norén et al.

(10) Patent No.: US 10,881,991 B2
(45) Date of Patent: Jan. 5, 2021

(54) FILTER INSERT AND A FILTER ARRANGEMENT

(71) Applicant: VOLVO TRUCK CORPORATION, Gothenburg (SE)

(72) Inventors: David Norén, Hindås (SE); Roger Bodén, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 15/761,439

(22) PCT Filed: Sep. 23, 2015

(86) PCT No.: PCT/EP2015/071881
§ 371 (c)(1),
(2) Date: Mar. 20, 2018

(87) PCT Pub. No.: WO2017/050368
PCT Pub. Date: Mar. 30, 2017

(65) Prior Publication Data
US 2019/0046904 A1    Feb. 14, 2019

(51) Int. Cl.
*B01D 29/21* (2006.01)
*B01D 29/54* (2006.01)
(Continued)

(52) U.S. Cl.
CPC .............. *B01D 29/21* (2013.01); *B01D 29/52* (2013.01); *B01D 29/54* (2013.01); *B01D 29/96* (2013.01);
(Continued)

(58) Field of Classification Search
CPC ........ B01D 29/21; B01D 29/54; B01D 29/96; B01D 29/52; B01D 35/16; B01D 35/153;
(Continued)

(56) References Cited

U.S. PATENT DOCUMENTS 6,569,326 B1 * 5/2003 Baumann ............... B01D 29/21
                                                                210/232
2004/0149640 A1    8/2004 Hennes et al.
(Continued)

FOREIGN PATENT DOCUMENTS

DE    19951085 A1    4/2001
DE    10315506 A1    10/2004
(Continued)

OTHER PUBLICATIONS

International Search Report (dated Jun. 1, 2016) for corresponching International App. PCT/EP2015/071881.
(Continued)

*Primary Examiner* — Madeline Gonzalez
(74) *Attorney, Agent, or Firm* — Venable LLP; Jeffri A. Kaminski

(57) ABSTRACT

A filter insert for being removably arranged in a filter housing includes a first connection arrangement for engaging a corresponding second connection arrangement of a filter housing lid for a connection to the filter housing lid. The first connection arrangement is arranged to simultaneously prevent a relative rotational movement between the filter insert and the filter housing lid and allow a relative axial movement between the filter insert and the filter housing lid.

31 Claims, 25 Drawing Sheets

(51) Int. Cl.
*B01D 29/96* (2006.01)
*B01D 35/153* (2006.01)
*B01D 35/16* (2006.01)
*F01M 1/10* (2006.01)
*F01M 11/03* (2006.01)
*B01D 29/52* (2006.01)

(52) U.S. Cl.
CPC ........... *B01D 35/153* (2013.01); *B01D 35/16* (2013.01); *F01M 1/10* (2013.01); *F01M 11/03* (2013.01); *B01D 2201/0415* (2013.01); *B01D 2201/24* (2013.01); *B01D 2201/295* (2013.01); *B01D 2201/301* (2013.01); *B01D 2201/305* (2013.01); *B01D 2201/4007* (2013.01); *B01D 2201/4015* (2013.01); *B01D 2201/4046* (2013.01); *B01D 2201/4053* (2013.01); *B01D 2201/4076* (2013.01); *F01M 2001/1057* (2013.01)

(58) Field of Classification Search
CPC .... B01D 2201/4015; B01D 2201/4046; B01D 2201/4076; B01D 2201/24; B01D 2201/295; B01D 2201/4053; B01D 2201/4007; B01D 2201/305; B01D 2201/301; B01D 2201/0415; F01M 11/03; F01M 1/10; F01M 2001/1057
USPC ................. 210/435, 442, 444, 447, 282
See application file for complete search history.

(56) References Cited

U.S. PATENT DOCUMENTS

| | | | |
|---|---|---|---|
| 2005/0000886 A1* | 1/2005 | Reynolds | B01D 35/30 210/450 |
| 2005/0236316 A1 | 10/2005 | Gould et al. | |
| 2006/0207929 A1 | 9/2006 | Epping et al. | |
| 2007/0170103 A1 | 7/2007 | Fick | |
| 2014/0183116 A1* | 7/2014 | Ardes | B01D 35/147 210/234 |

FOREIGN PATENT DOCUMENTS

| | | |
|---|---|---|
| DE | 202007017614 U1 | 6/2009 |
| EP | 2806148 A1 | 11/2014 |
| GB | 2290486 A | 1/1996 |
| GB | 2375973 A | 12/2002 |
| JP | 408290014 A | 11/1996 |
| WO | 0123068 A1 | 4/2001 |
| WO | 2011127479 A1 | 10/2011 |
| WO | 2014124974 A1 | 8/2014 |

OTHER PUBLICATIONS

European Office Action dated Dec. 6, 2019 in EP Application No. 15770851.2, 5 pages.
European Summons to Attend Oral Proceedings Pursuant to Rule 115(1) EPC dated Oct. 19, 2020 in corresponding European Patent Application No. 15770851.2, 7 pages.

* cited by examiner

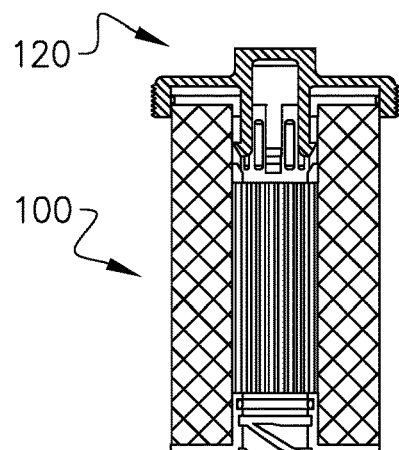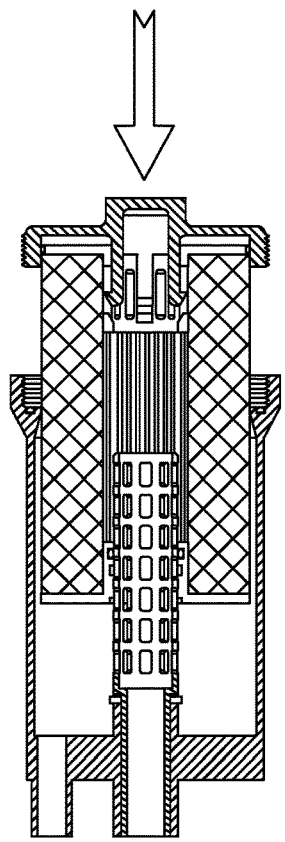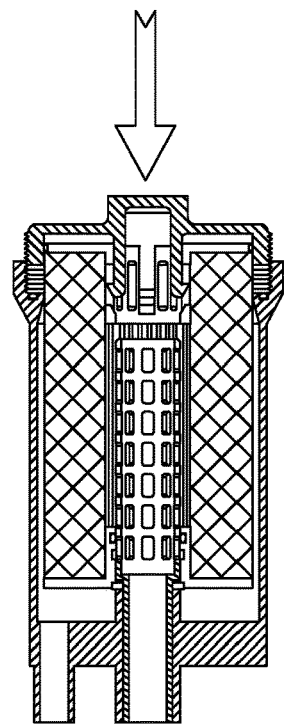
FIG. 13a        FIG. 13b        FIG. 13c
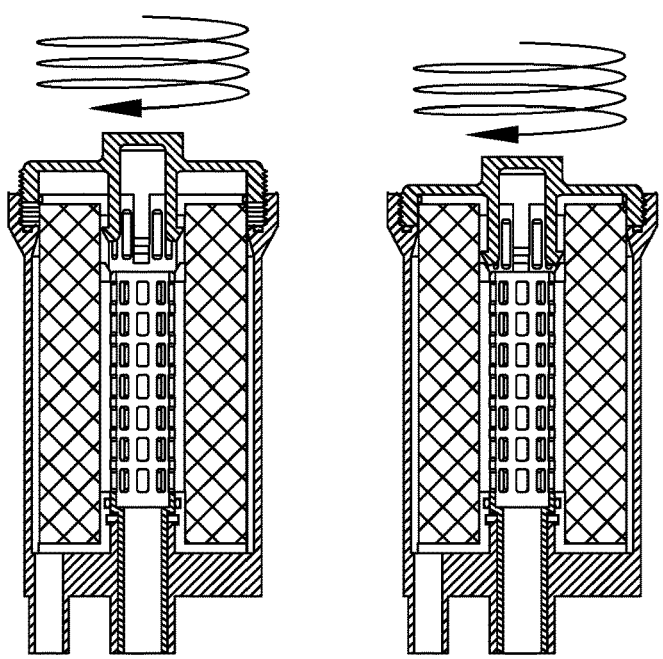
FIG. 13d        FIG. 13e

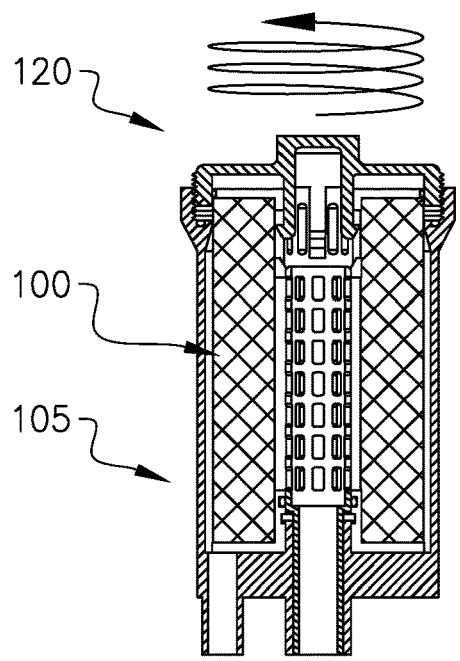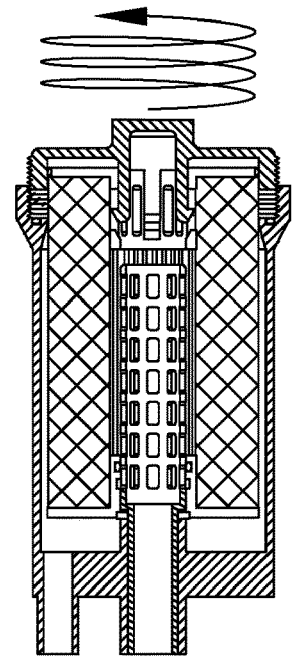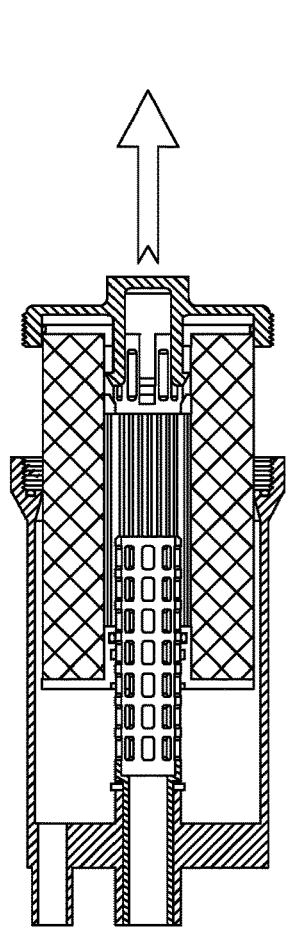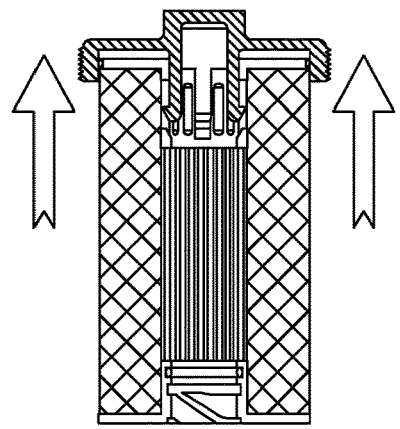
FIG. 13f   FIG. 13g
FIG. 13h   FIG. 13i

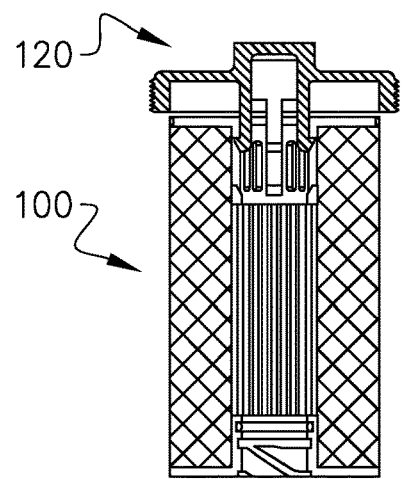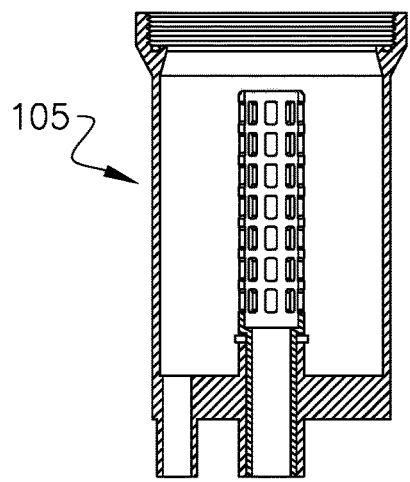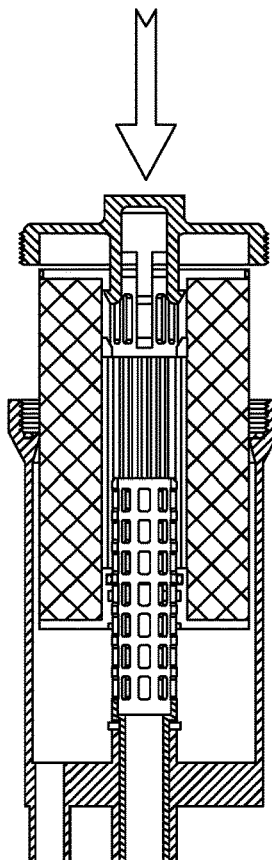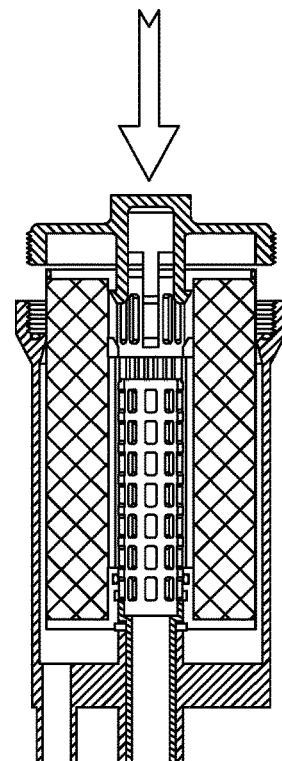
FIG. 14a  FIG. 14b  FIG. 14c
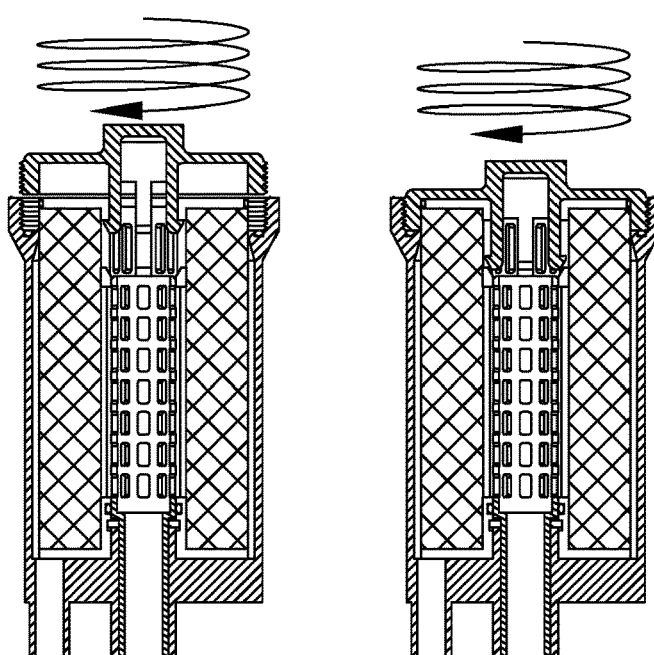
FIG. 14d  FIG. 14e

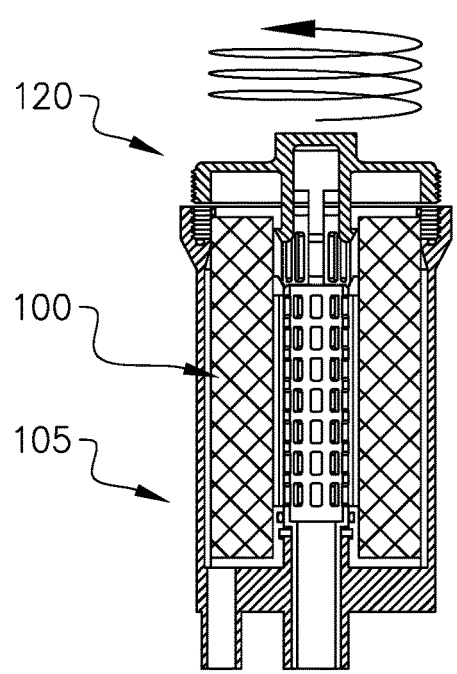
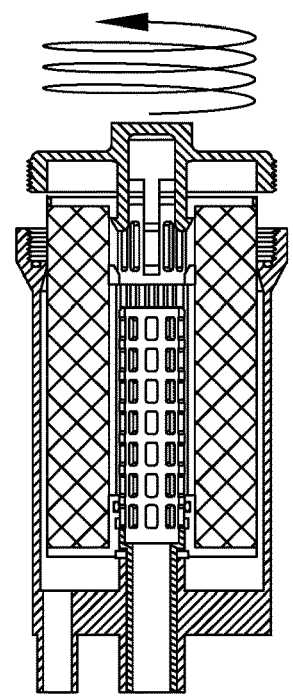
FIG. 14f    FIG. 14g
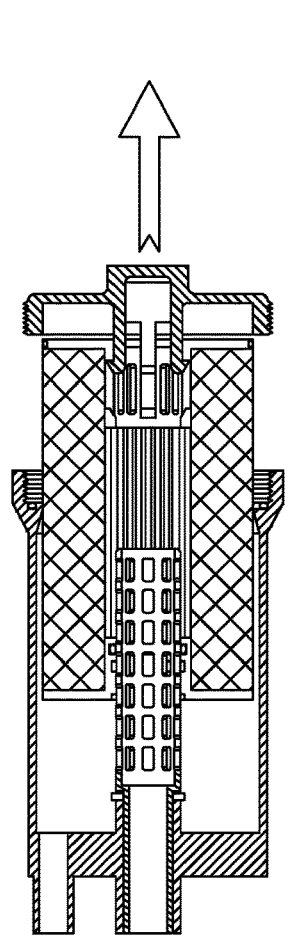
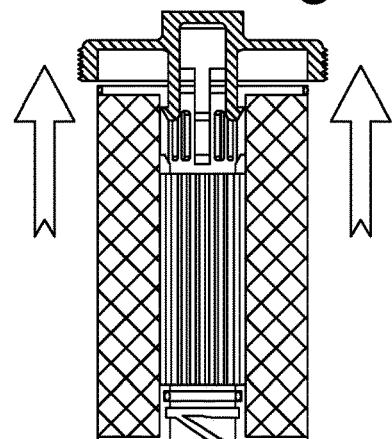
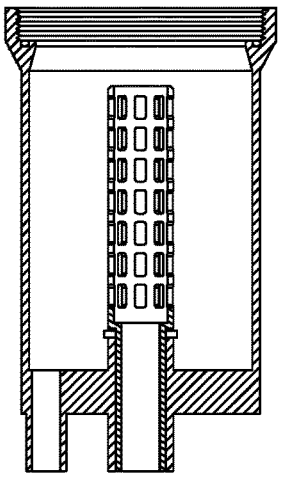
FIG. 14h    FIG. 14i

FILTER INSERT AND A FILTER ARRANGEMENT

BACKGROUND AND SUMMARY

The invention relates to a filter insert and a filter arrangement for cleaning a fluid. More specifically, the filter insert and filter arrangement are adapted for cleaning a fluid for an internal combustion engine, wherein the fluid may be a liquid such as a lubricating oil or fuel or a gas such as air. Such filters may be provided onboard vehicles and in other applications containing transport systems to remove unwanted solids or other contaminants from the fluid. The filter insert may be called filter cartridge or filter module.

The filter arrangement comprises a filter housing, which may be non-removably attached to the internal combustion engine. The filter housing is cup-shaped with an upper open, access end for receipt of the filter insert. The filter housing encompasses at least one inlet for raw fluid to be filtered, which empties into a raw side of the filter housing, and an outlet, which starts at a clean side of the filter housing, for filtered clean fluid. The inlet and outlet are provided in a lower portion of the filter housing. The filter housing defines a longitudinal axis, along which the filter insert can be inserted into the filter housing and removed from it. The filter arrangement further comprises a removable lid for closing the open end of the filter housing during operation. The lid may also be called cover or cap.

The invention can be applied in an internal combustion engine, such as a diesel engine, for heavy-duty vehicles, such as trucks, buses and construction equipment. Although the invention will be described with respect to a diesel engine for a truck, the invention is not restricted to this particular application, but may also be used in other types of engines and for other types of vehicles, such as passenger cars.

US 2004/0149640 discloses a filter device including a cup-shaped filter housing that defines a longitudinal axis along which a filter element can be inserted into and removed from the filter housing. A retaining device detachably retains the filter element in the filter housing and has first and second retaining elements on the inner side of the filter housing and on the filter element and interacting with one another. At least one set of the retaining elements has a shape coaxial to the longitudinal axis of the filter housing and forms at least a part of a thread. When the filter element is rotated about its longitudinal axis, it is locked in a form-fit.

DE 202007017614 U1 discloses: A liquid filter having a filter housing with a first thread and a drain passage. A filter element including a filter medium is arranged in the filter housing. A filter lid is provided with a second thread configured to engage the first thread for connecting the filter lid to the filter housing. The filter lid further has a filter bypass valve for bypassing the filter element when a pressure loss that is too high occurs when liquid passes through the filter medium of the filter element. First bayonet connectors are provided on the filter lid and second bayonet connectors are provided on the filter element for connecting the fitter element to the filter lid by engaging the first bayonet connectors. A double-concentric seal is arranged on the filter element for closing off the drain passage.

DE 19951085 discloses according to its abstract: A filter having a casing with a receiving cavity for an annular filter insert. There is a ramp at the bottom of the receiving cavity positioned relative to a faucet and contact zones so that when the insert is fitted to the faucet, if not in the aperture of the outlet channel, has its contact zone on that of the ramp.

US 2005/0236316 discloses according to its abstract: A spring-biased filter assembly for a liquid dispenser that permits ready removal of a filter assembly from a filter housing. The filter housing includes a liquid inlet, a liquid outlet, and a liquid passageway therebetween. The filter housing also has an opening in communication with the liquid passageway. The filter assembly comprises a closure element positioned in the opening and releasably coupled to the filter housing through movement between connected and disconnected positions with respect to the filter housing. A filter element is positioned in the liquid passageway and coupled to the closure element. A biasing member is coupled to the closure element and the filter element and biases the closure element into the connected position.

It is desirable to provide a filter insert, which creates conditions for removing a used filter insert from the filter housing and/or inserting a new filter insert into the filter housing in an efficient way with regard to time and/or cleanliness.

According to an aspect of the invention, a filter insert is provided for being removably arranged in a filter housing, wherein the filter insert comprises a first connection means for engaging a corresponding second connection means of a filter housing lid for a connection to the filter housing lid, characterized in that the first connection means is arranged to simultaneously prevent a relative rotational movement between the filter insert and the filter housing lid and allow a relative axial movement between the Filter insert and the filter housing lid.

The first connection means of the filter insert and the corresponding second connection means of the filter housing lid are preferably matched relative to each other in shape and size for establishing the connection simultaneously preventing the relative rotational movement and allowing the relative axial movement. For example, the connection means may be formed by male-female portions, wherein the male portion is formed on one of the filter insert and the filter housing lid and the female portion is formed on the other one of the filter insert and the filter housing lid.

By means of the specific connection between the filter insert and the filter housing lid, a used filter insert can be removed from the filter housing by removing the filter housing lid from the filter housing. This is especially preferable when the filter housing lid is attached to the filter housing via a threaded connection, wherein the turning of the filter housing lid relative to the filter housing would bring the filter insert along with the filter housing lid due to the connection preventing a relative rotational movement between the filter insert and the filter housing lid. Thus, the removal of the filter housing lid and the filter insert from the filter housing will be achieved in one single operation, namely the rotation of the filter housing lid. Thus, a service technician does not need to touch the used filter insert, which may be covered with fluid, during removal of the filter insert from the filter housing.

Preferably, the feature to prevent a relative rotational movement between the filter insert and the filter ho using lid may be accomplished via a tight fit circumferentially. However, the feature "to simultaneously prevent a relative rotational movement between the filter insert and the filter housing lid and allow a relative axial movement between the filter insert and the filter housing lid" is not limited to that the first and second connection means are tightly fit to each other in both directions circumferentially. Thus, there may be a play circumferentially. Thus, the connection means may be designed so that when turning the lid in a first circumferential direction, the filter insert is allowed to travel in a first axial direction relative to the lid. On the other hand, when turning the lid in a second circumferential direction, opposite to the first axial direction, the filter insert is allowed to travel in a second axial direction, opposite to the first circumferential direction, relative to the lid. The first connection means and the second connection means may be arranged so that a projection glides along a first wall edge limiting an opening in the circumferential direction during the first relative axial movement and glide along a second wall edge limiting the opening on the other side in the other circumferential direction during the second relative axial movement.

Further, the specific connection between the filter insert and the filter housing lid creates conditions for a reliable positioning of the filter insert in its operational position inside the filter housing in a time-efficient way by first attaching a new filter insert to the lid and then attaching the lid to the filter housing, wherein the filter insert is allowed to move axially in relation to the filter housing lid during insertion.

According to one embodiment, the first connection means is arranged to allow a relative axial movement between the filter insert and the filter housing lid only a predetermined first distance. The predetermined distance is preferably associated to an axial extension of a guiding movement between the filter insert and the filter housing during insertion/removal of the filter insert for allowing a reliable positioning of the filter insert inside the filter housing in the case of the lid being screwed onto the filter housing via a threaded connection. The connection means is preferably arranged to guide the filter insert relative to the filter housing lid in the axial direction the predetermined distance.

According to a further development of the last mentioned embodiment, the first connection means comprises axially spaced stops for limiting the relative axial movement between the filter insert and the filter housing lid to said predetermined distance. Said stops are preferably mechanical stops formed by some kind of structure or body.

According to a farther embodiment, the first connection means comprises a wall portion with at least one radial opening for receipt of a projection extending from the lid. Said wall portion is preferably a tubular portion. The radial opening preferably has an elongated shape and may be formed by a groove or slot with a main axial extension. According to one example, the openings are circumferentially uniformly distributed. Further, the connection means preferably comprises a plurality of circumferentially spaced radial openings for receipt of corresponding projections extending from the lid. According to one example, the projections are circumferentially uniformly distributed in a way matching the openings. The projections may be formed by radially elastic fingers.

Preferably, wall sections of the portion at opposite ends of the radial opening in the axial direction defines the axially spaced stops. Further preferably, wall sections of the wall portion at opposite ends of the radial opening in the circumferential direction defines circumferentially spaced stops.

According to a further embodiment, the first connection means is arranged for a snap connection between the filter insert and the filter housing lid. The snap connection provides for a quick release coupling. Preferably, the first connection means is arranged for a releasable connection to the filter housing lid.

According to a further embodiment, the filter insert comprises a first retaining means arranged for engaging a corresponding second retaining means of the filter housing and wherein the retaining means is arranged for guiding the filter insert during movement relative to the filter housing. This creates conditions for a reliable positioning of the filter insert inside the filter housing. Further, this embodiment creates conditions for achieving a desired attachment force between the filter insert and the filter housing and especially a desired tightness. Further, this embodiment creates conditions for a certain tolerance range in the axial direction between different individual filter inserts.

The first retaining means is preferably separate from the first connection means and further preferably axially spaced from the first connection means. The first retaining means is preferably configured for guiding the filter insert during insertion into the filter housing and removal from the filter housing. Preferably, the first retaining means is adapted for guiding the filter insert along a path, which has an axial component and a circumferential component relative to the filter housing. Preferably, the path is continuous in both the axial and circumferential direction. The retaining means may be co-axial in relation to a longitudinal direction of the filter insert. The retaining means may be formed by a male-female configuration. One of the retaining means may comprise a surface, which is inclined in relation to a circumferential direction of the filler insert, and the other one of the retaining means comprise a complimentary radially projecting portion for a gliding contact with the inclined surface. The retaining means may comprise a threaded section. Preferably, the retaining means is adapted for guiding the filter insert along a path, which is non-parallel to any fastening means, such as a threading, between the lid and the filter housing.

According to a further development of the last mentioned embodiment, the filter insert is arranged to move axially relative to the filter housing lid via the connection means when the first retaining means is in engagement with the corresponding second retaining means of the filter housing for movement of the filter insert along said path. This creates conditions for an easy mounting of the filter insert into the filter housing, wherein a service technician during a filter insert exchange, after attachment of the lid to a new filter insert via the connection means only needs to match the fastening means (such as a threading) of the lid relative to the corresponding fastening means (such as a threading) of the filter housing and rotate the lid for positioning the filter insert in the filter housing.

Preferably, the first retaining means is positioned axially spaced from the first connection means. Further preferably, the first retaining means is positioned at a first, lower end of the filter insert while the first connection means is positioned at a second, upper end of the filter insert. Further preferably, the filter insert is hollow and the first retaining means is positioned inside of the filter insert.

According to a further embodiment, the first retaining means is formed by at least one radially extending projection for engagement with an inclined surface provided in the filter housing. Preferably, the first retaining means comprises a plurality of circumferentially spaced radially extending projections. Further preferably, the inclined surface forms part of a groove/slot.

According to an alternative to the last-mentioned embodiment, the first retaining means is formed by at least one inclined surface extending in a circumferential direction and an axial direction for receiving a radially extending projection provided in the filter housing. Preferably, the first retaining means comprises a plurality of circumferentially spaced such inclined surfaces. Preferably, the inclined surface has a certain pitch. Further preferably, the inclined surface forms part of a groove/slot. Preferably, two inclined surfaces forms opposite, parallel sides of the groove/slot, wherein the second retaining means may be adapted to glide along a first of said inclined surfaces during removal of the filter insert from the filter housing and along a second of the inclined surfaces during insertion of the filter insert into the housing.

According to a further embodiment, the filter insert comprises a tubular portion and wherein the first retaining means forms a part of the tubular portion. The filter insert may have the shape of a hollow cylinder, wherein the tubular portion may define the interior space in the hollow cylinder.

According to a further embodiment, the filter insert comprises a filter material body and wherein the first retaining means is arranged at a circumference of the filter material body. The filter insert may have the shape of a hollow cylinder and the first retaining means may be arranged at an inner circumference of the interior space in the hollow cylinder. Thus, the filter insert guiding means is provided on a radially inner surface of the filter material body. In other words, the filter insert guiding means is provided on a surface of the filter material body exposed radially inwards. Such a design of the filter insert may be advantageous in that the guiding means may be attached to an internal fluid permeable support tube, or similar, of the filter housing for reinforcing the filter material body arranged inside the filter material body.

The filter material body preferably has a cylindrical shape. The term "cylindrical shape" defines a volume enclosed by two planes perpendicular to an axis extending in an axial direction of the filter insert. The cross section of the cylinder at right angles to the axis is preferably circular forming a right circular cylinder. The filter material body may be hollow-cylindrical and formed by a pleated structure. However, the filter material body preferably may be non-cylindrical, for example the volume may not be defined by two two planes perpendicular to an axis. The axially limiting portions of the filter material body may be planes, but at least one of them may be non-perpendicular in relation to said axis. Further, at least one of the axially limiting portions of the filter material body may have a shape deviating from a straight plane, such as curved.

The term "circumference" is defined a circumferential surface of the filter insert. The circumferential surface may be continuous in a circumferential direction or, as in the example of the pleated structure, be non-continuous in the circumferential direction.

It is also desirable to provide a filter arrangement, which creates conditions for removing a used filter insert from the filter housing and/or inserting a new filter insert into the filter housing in an efficient way with regard to time and/or cleanliness.

According to an aspect of the invention, a filter arrangement is provided comprising
- as filter insert for being removably arranged in a filter housing, wherein the filter insert comprises a first connection means, and
- a filter housing lid for closing the filter housing, wherein the filter housing lid comprises a second connection means, wherein the first connection means and the second connection means are arranged for engagement with each other in such a manner to simultaneously prevent a relative rotational movement between the filter insert and the filter housing lid and allow a relative axial movement between the filter insert and the filter housing lid.

Further advantages and advantageous features of the invention are disclosed in the following description and in the further dependent claims.

BRIEF DESCRIPTION OF THE DRAWINGS

With reference to the appended drawings, below follows a more detailed description of embodiments of the invention cited as examples.

In the drawings:

FIG. 13a-e shows different steps in a process for mounting the filter insert into the filter housing in the filter arrangement according to the first embodiment, FIG. 13f-i shows different steps in a process for removing the filter insert from the filter housing in the filter arrangement according to the first embodiment, FIG. 14a-e shows different steps in an alternative process for mounting the filter insert into the filter housing in the filter arrangement according to the first embodiment, FIG. 14f-i shows different steps in a process for removing the filter insert from the filter housing in the filter arrangement according to the second embodiment.

DETAILED DESCRIPTION

Figure 1:
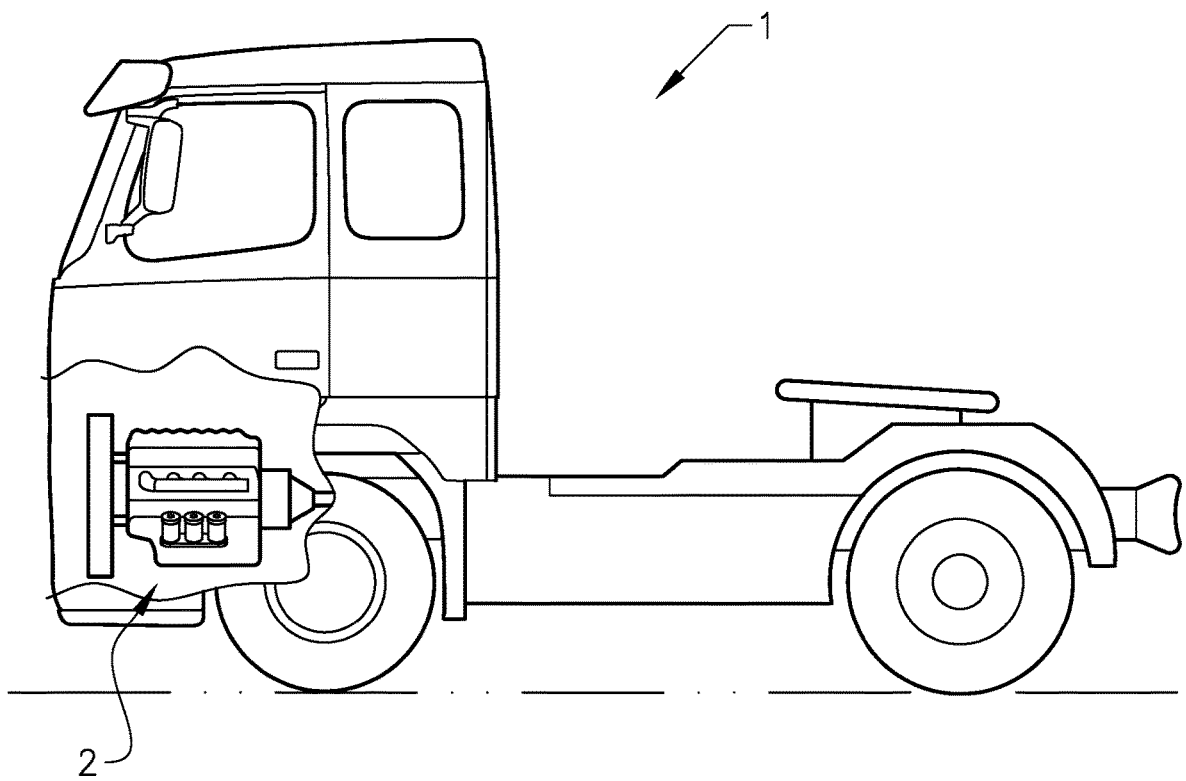
FIG. 1 discloses a vehicle in the form of a truck in a side view.

FIG. 1 discloses a vehicle in the form of a truck 1 in a partly cut side view. Further, an internal combustion engine (ICE) in the form of a diesel engine 2 for propelling the truck is indicated.

Figure 2:
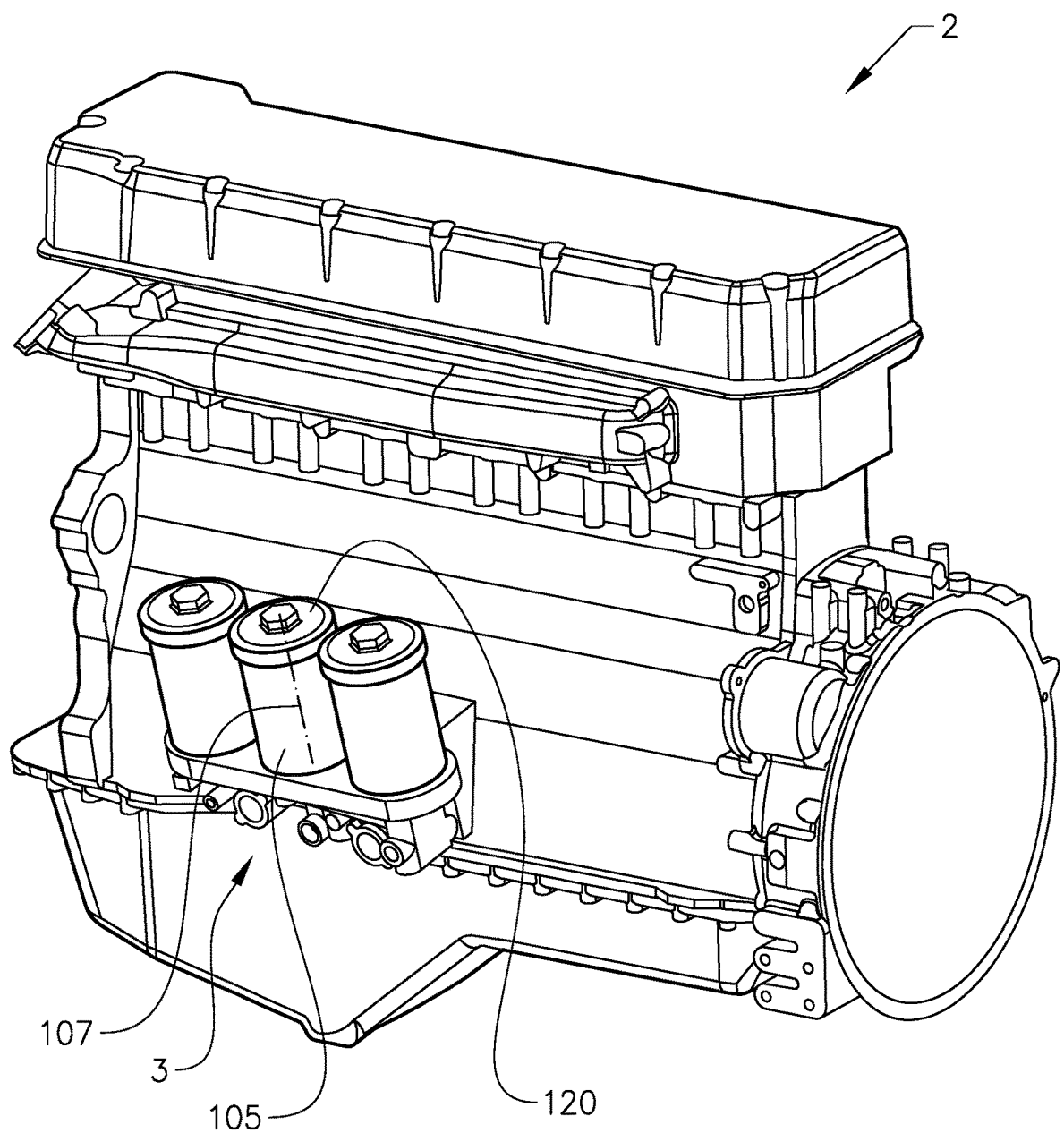
FIG. 2 discloses an internal combustion engine of the truck in a perspective view with a filter arrangement attached, FIG. 3 discloses the filter arrangement of FIG. 2 in a partly assembled state.

FIG. 2 shows the ICE 2 provided with a filter arrangement 3 according to a first embodiment example of the invention. The filter arrangement 3 is adapted for filtering a fluid for the ICE. More specifically, there are three identical filter arrangements 3 arranged in parallel with each other. The filter arrangement 3 comprises a filter housing 105, which is non-removably attached to the ICE. The filter arrangement 3 is in an upright, standing position, slightly inclined outwards from its attachment at the bottom relative to a side of the ICE. A lower section of the filter arrangement 3 comprises inlets and outlets, which will be explained later. The filter housing 105 is in the form of a cup-shaped part, which is rigidly attached to the lower section. The filter housing 105 defines a longitudinal axis 107 along which a filter insert (not shown) can be inserted into the filter housing and, removed from the filter housing via, an upper access opening. The filter arrangement 3 further comprises a lid 120 for closing the filter insert opening of the filter housing.

Figure 3:
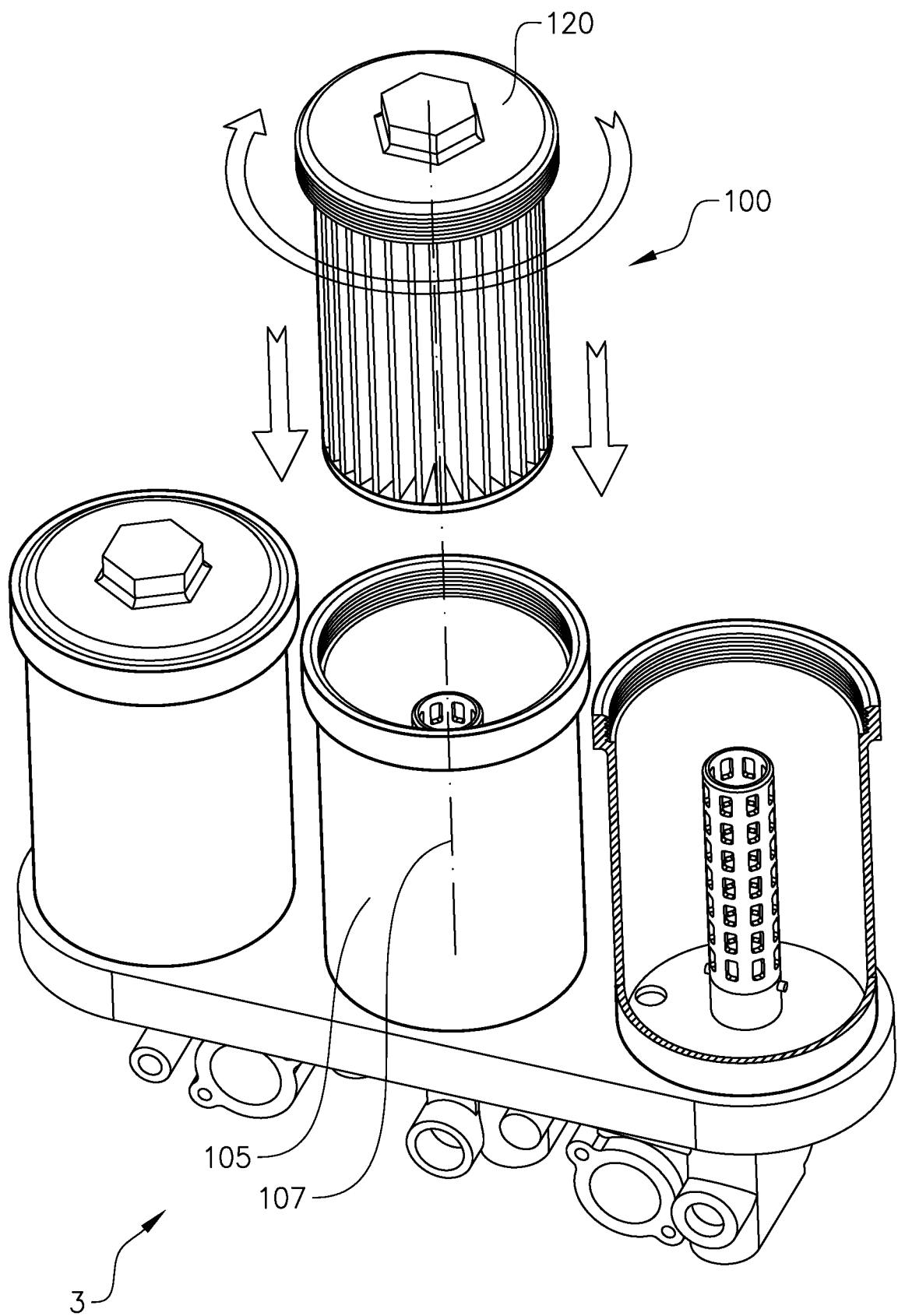

FIG. 3 discloses the filter arrangement 3 of FIG. 2 in a partly assembled state. A filter insert 100 according to a first embodiment example is attached to the lid 120 for being inserted into the filter housing 105 via first an axial movement and then a rotational movement around the longitudinal axis 107, see arrows.

Figure 4:
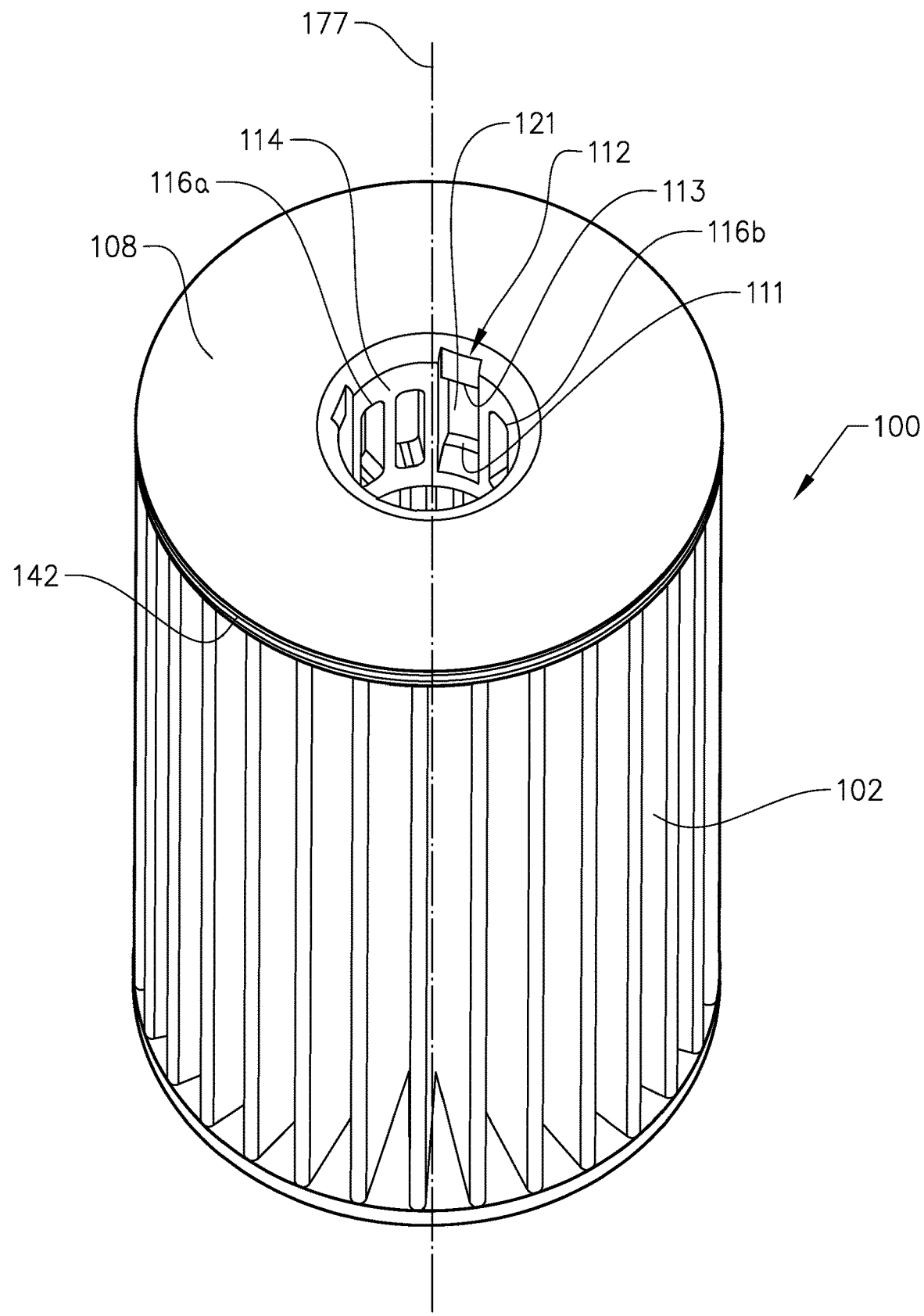
FIG. 4 is a perspective view from the top of a filter insert according to a first embodiment example.
Figure 5:
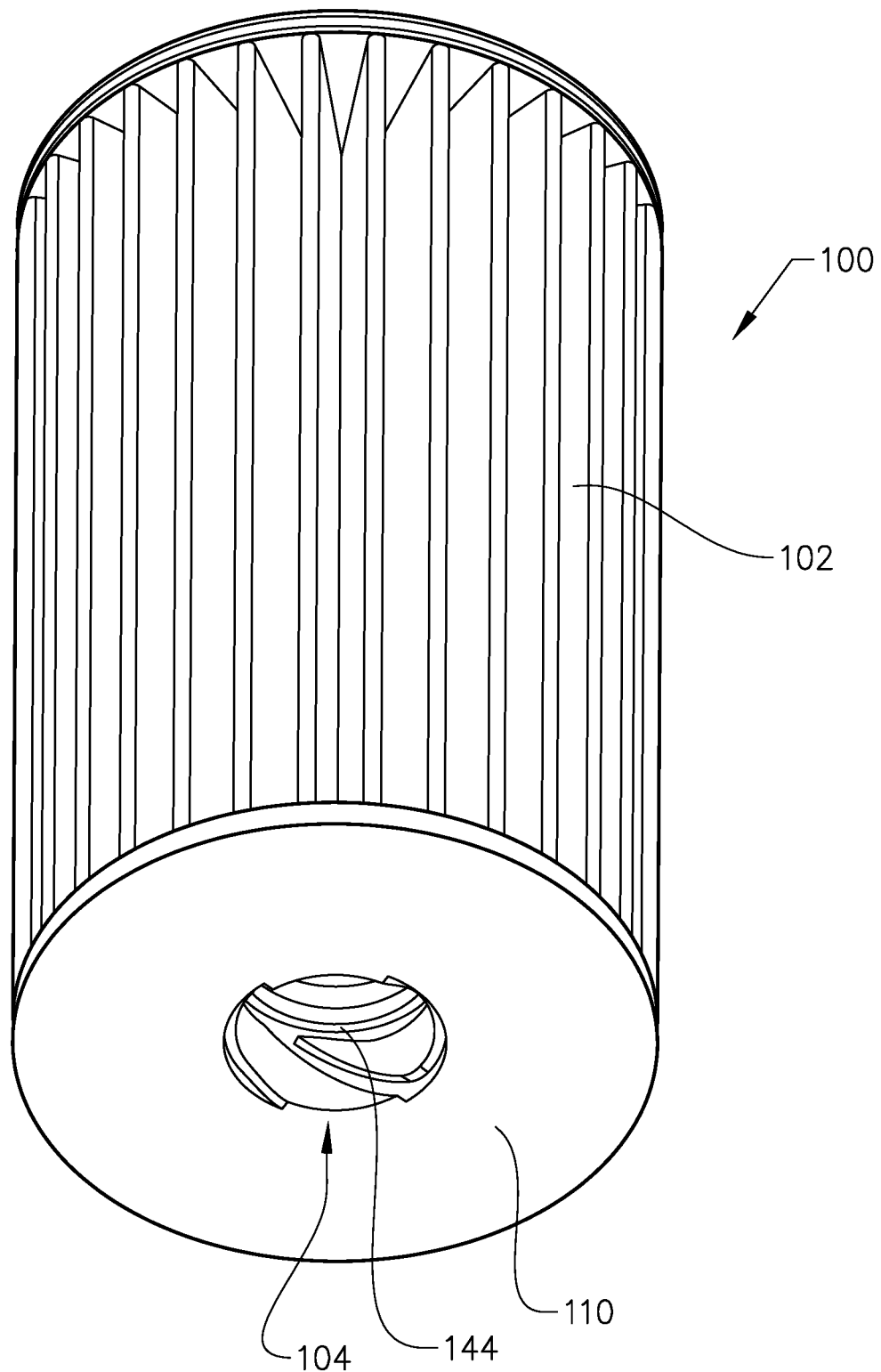
FIG. 5 is a perspective view from below of the filter insert according to the first embodiment example.
Figure 6:
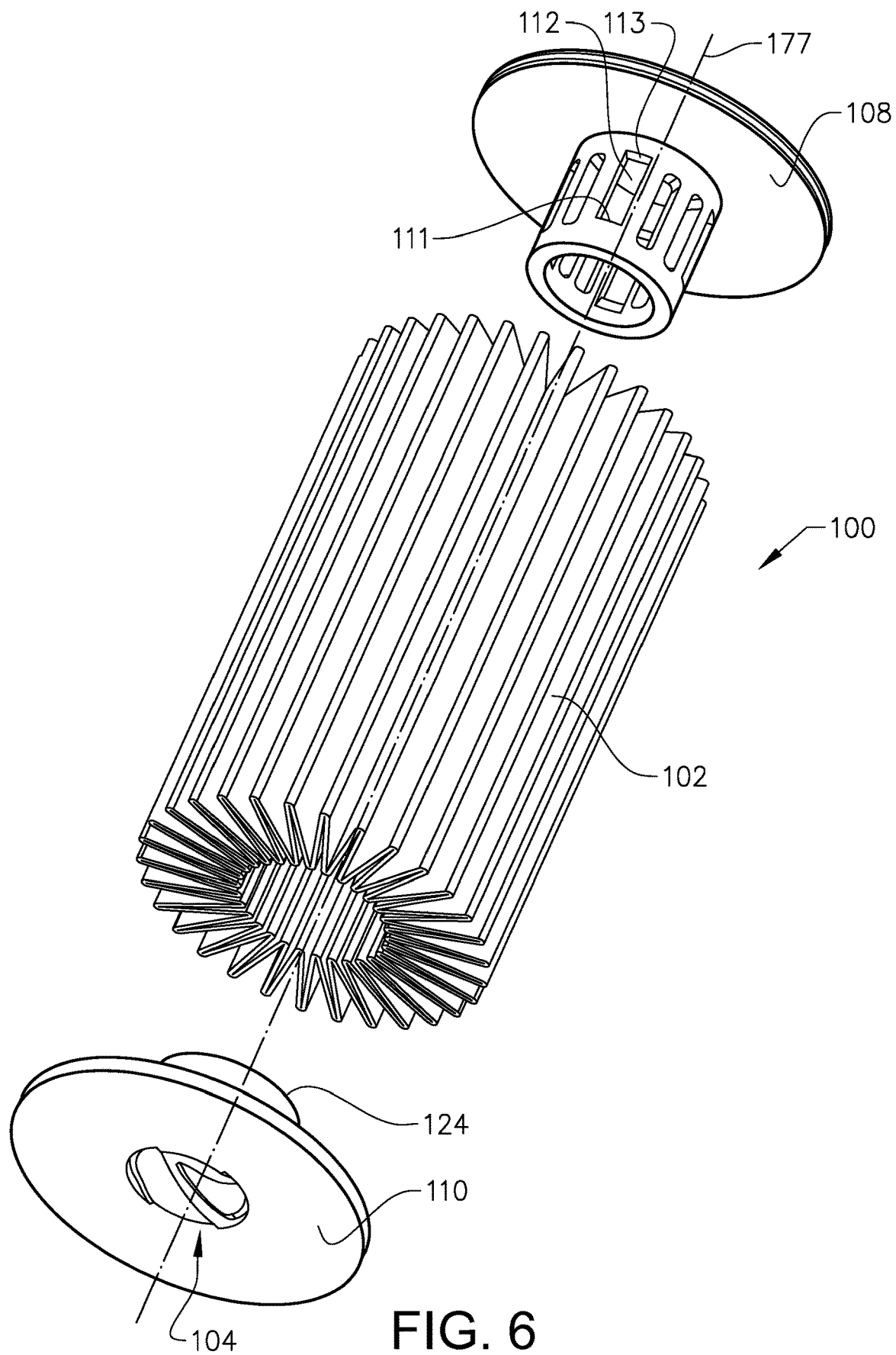
FIG. 6 is an exploded perspective view of the filter insert according to the first embodiment example.

FIGS. 4-6 show the filter insert 100 according to a first embodiment example for being removably arranged in the filter housing 105. The filter insert 100 comprises a filter material body 102. The filter material body 102 has a hollow circular cylindrical shape. Thus, the filter material body 102 has an external cross sectional shape generally defining a circle. Further, the filter material body 102 has an internal cross sectional shape generally defining a circle. Further, the filter material body 102 is formed by a pleated structure. More specifically, the filter material body 102 is formed by an elongated sheet of paper (strip), which has been folded successively back and forth and configured to assume the cylindrical shape, for example via rolling. The cylindrical filter material body 102 has its axis parallel to the line of the pleatings.

The filter insert 100 further comprises a filter material body support structure 108,110 at each end of the filter insert in its axial direction 177. The filter material body support structures 108,110 have a main extension in a radial direction of the filter insert. Each of the filter material body support structures 108,110 has a plate shaped structure extending in a plane perpendicular to the axial direction of the filter insert. The filter material body support structures 108,110 will in the following be referred to as an upper and lower panel 108,110. Thus, the filter material body 102 is delimited on the top by the upper panel 108 and on the bottom by the lower panel 110, The panels 108,110 may be formed by separate parts attached to the filter material body 102. The filter material body 102 is then bonded to the upper panel 108 and the lower panel 110 at the edges of the filter paper in the axial direction of the filter insert. The panels 108,110 may be made of plastics and the filter material body 102 is connected to the panels by non-contact infrared bonding or other bonding processes, such as hot-plate bonding. Alternatively, the panels 108,110 are formed by a glue or other fastening fluid attached to the edges of the filter material body 102 in the axial direction of the filter insert and then solidified.

Figure 7:
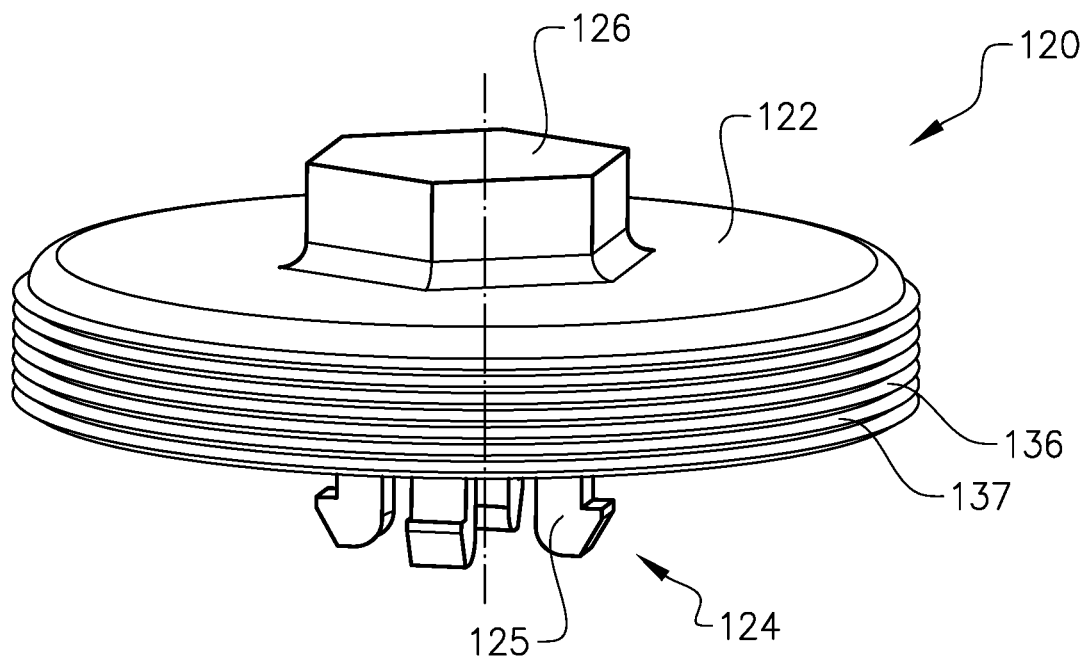
FIG. 7 is a perspective view from the top of a lid according to a first embodiment example.
Figure 8:
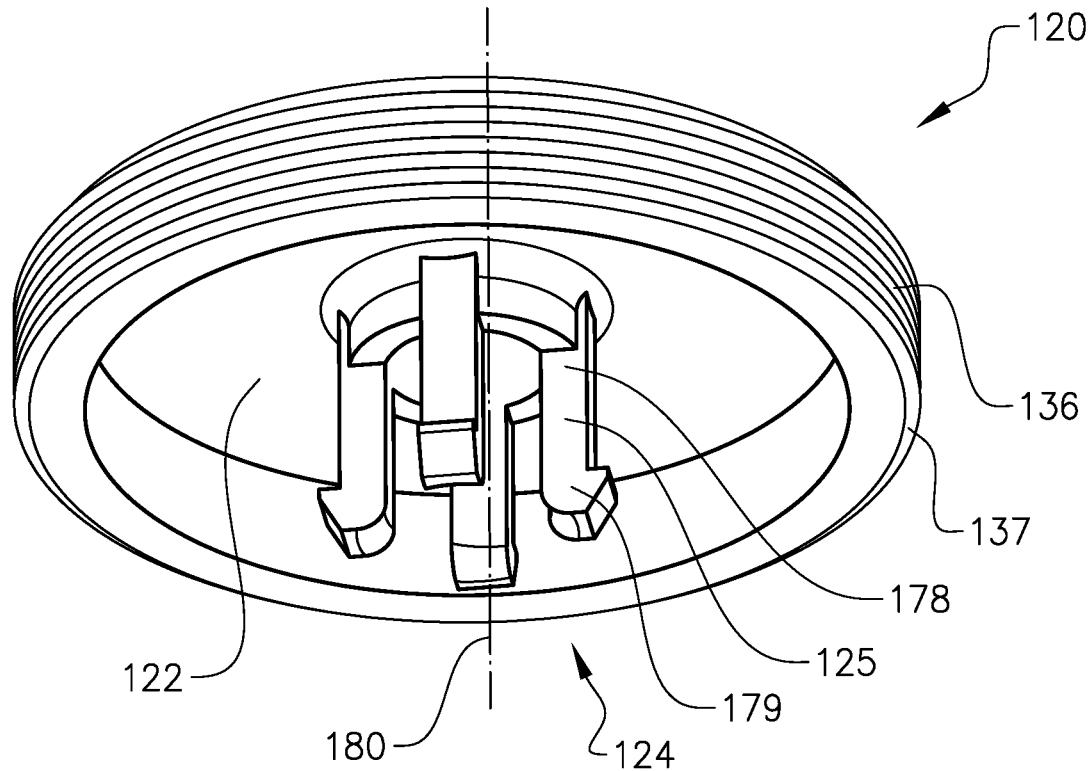
FIG. 8 is a perspective view from below of the lid according to the first embodiment example, FIG. 9 discloses the lid according, to the first embodiment example attached to the filter insert according to the first embodiment example.

The filter insert 100 further comprises a first connection means 112 for engaging a corresponding second connection means 124 of the filter housing lid 120, see FIGS. 7-8, for a connection to the filter housing lid. The first connection means 112 is arranged to simultaneously prevent a relative rotational movement between the filter insert 100 and the filter housing lid 120 and allow a relative axial movement between the filter insert 100 and the filter housing lid 120.

The first connection means 112 is arranged to allow a relative axial movement between the filter insert and the filter housing lid 120 only a predetermined first distance. The first connection means 112 comprises axially spaced stops 111, 113 for limiting the relative axial movement between the filter insert 100 and the filter housing lid 120 to said predetermined distance. The first connection means 112 comprises a wall portion 114 with at least one radial opening 121 for receipt of a projection of the second connection means 124 of the filter housing lid 120. The portion 114 is formed by a first tubular structure arranged inside of the filter material body 102. The first tubular structure 114 is formed in a one-piece unit with the upper panel 108. Further, the first connection means 112 is configured for a snap connection with the lid 120. Further, the first tubular structure 114 is fluid permeable. The first tubular structure 114 has a plurality of circumferentially spaced of openings 116a,b for fluid passage during operation.

Thus, the first connection means 112 is adapted for a rotationally rigid connection between the lid 120 and the filter insert 100. Further, the first connection means 112 is adapted for a connection between the lid 120 and the filter insert 100 allowing the filter insert 100 and the lid 120 to be interconnected for being moved in unison in relation to the filter housing 105. Thus, the first connection means 112 is arranged to achieve a connection between the filter insert 100 and the lid 120 in such a manner that the lid 120 can be gripped, rotated (preferably unscrewing via a threading) and then lifted from the filter housing 105 while the used filter insert is moved in unison with the lid during a removal of the used filter insert. The lid can then be detached from the used filter insert and attached to a new filter insert. Insertion of the new filter insert into the filter housing is accomplished via gripping the lid, inserting the filter insert into the filter housing and rotating the lid (screwing via threadings) to a fully inserted position (operational position).

Figure 10:
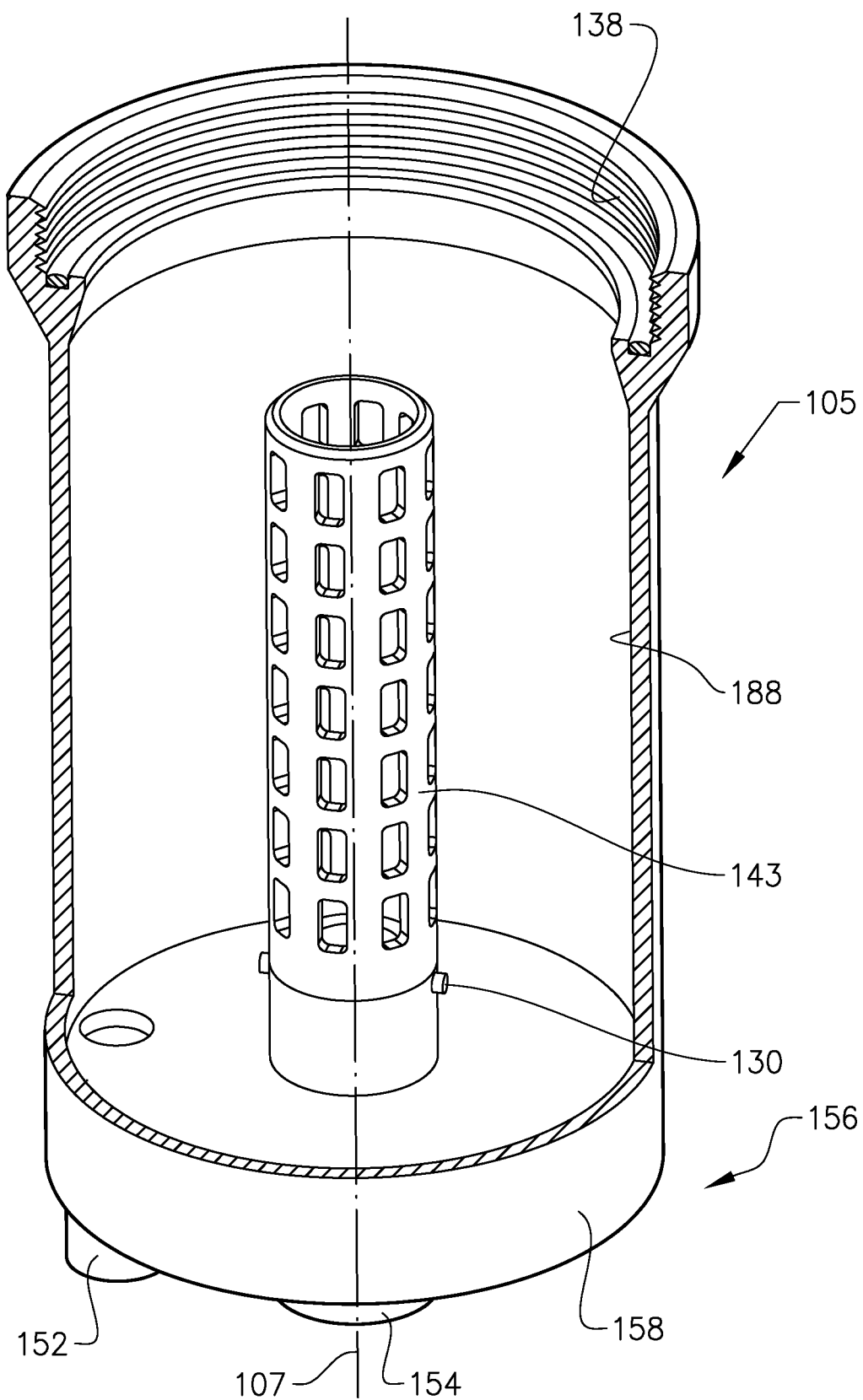
FIG. 10 is a partially cut perspective view from the top of a filter housing according to a first embodiment example.

Further, the filter insert 100 comprises a first retaining means 104 arranged for engaging a corresponding second retaining means 130 of the filter housing 105, see FIG. 10, and wherein the retaining means is arranged for guiding the filter insert 100 during movement relative to the filter housing 105. The first retaining means 104 is adapted for guiding the filter insert along a path, which has an axial component and a circumferential component relative to the filter housing 105. The first retaining means 104 is positioned axially spaced from the first connection means 112. The filter insert comprises a second tubular structure 124 and wherein the first retaining means 104 forms a part of the second tubular structure. The second tubular structure 124 is arranged to define an interior space in the filter insert. More specifically, the first retaining means 104 is arranged at an inner circumference of the filter material body. The second tubular structure 124 is attached to the lower panel 110 and preferably forms a one-piece unit therewith.

A first section 126 of the first retaining means 104 comprises at least one inclined surface 151,153 extending in a circumferential direction and an axial direction for receiving a radially extending projection 130 provided in the filter housing, see FIG. 10. In the shown example, two inclined surfaces 151,153 are provided, which face each other and define a first groove 155, see FIG. 5b. Thus, the first section of the first retaining means 104 forms a threaded structure. The first section has a first pitch.

The first retaining means 104 has a second section 128 in communication with the first section 126 for guiding the filter insert 120 in a circumferential path with no pitch, or a very small pitch. The second section 128 forms a second groove 132 with an extension substantially in a circumferential direction. The first and second sections 126,128 are in direct communication with each other. Thus, one end of the first groove 155 is open to the second groove 132. One side wall 157 of the entrance to the first groove 155 from the second groove 132 is projecting axially in relation to the other side wall 159 for facilitating that the radially extending projection 130 finds the entrance during rotation of the filter insert 100 for removal of the filter insert. Further, the second section 128 is positioned closer to the upper end panel 108 than the first section 126.

The filter insert 100 further comprises sealing means 142,144 for sealingly engage an inner surface of the lid 120 and the filter housing 105, respectively, in order to separate a raw side from a clean side of the filtering arrangement. A first sealing means 142 in the form of a ring is provided on an external side of the upper panel 108 for a sealing engagement with the lid 120 in a radial direction. A second sealing means 144 in the form of a ring is provided on an external side of the lower panel 110 for a sealing engagement with a surface of the filter housing 105 in a radial direction.

FIGS. 7-8 shows the lid 120 according to a first embodiment example for being removably attached to the filter housing 105. The lid 120 comprises a plate shaped portion 122, second connection means 124 projecting from a first, lower side of the plate shaped portion 122, for attachment to the first connection means 112 of the filter insert 100, and engagement means 126 arranged on a second, upper side of the plate shaped portion 122, for engagement with a tool during insertion and removal of the lifter insert, if necessary. The engagement means 126 has a peripheral polygonal shape for engagement with a correspondingly designed removal tool for use in case the filter insert and/or lid is stuck to the filter housing. The engagement means 126 is here in the form of an axial projection coaxial with a centre axis direction 180 of the lid 120.

The plate shaped portion 122, second connection means 124 and engagement means 126 are formed in a one-piece unit. The second connection means 124 is formed by snap means. The snap means 124 is formed by a plurality of circumferentially spaced fingers 125 projecting from the plate shaped portion 122.

In the example show, the snap means 124 comprises four fingers 125. Each finger forms a hook and comprises a first, substantially straight portion 178, extending in parallel with an axis 180 of the lid and a second radially projecting portion 179 extending from a free end of the straight portion.

The fingers are radially elastic for riding along an inside surface of the tubular portion 114 in a compressed state before reaching its associated opening 121 and then radially flex into the opening. The filter insert 100 is in this way locked on its upper front panel to the lid via the snap-lock means 124, so that the removal of the lid from the housing automatically leads to a removal of the filter insert from the housing.

Figure 11:
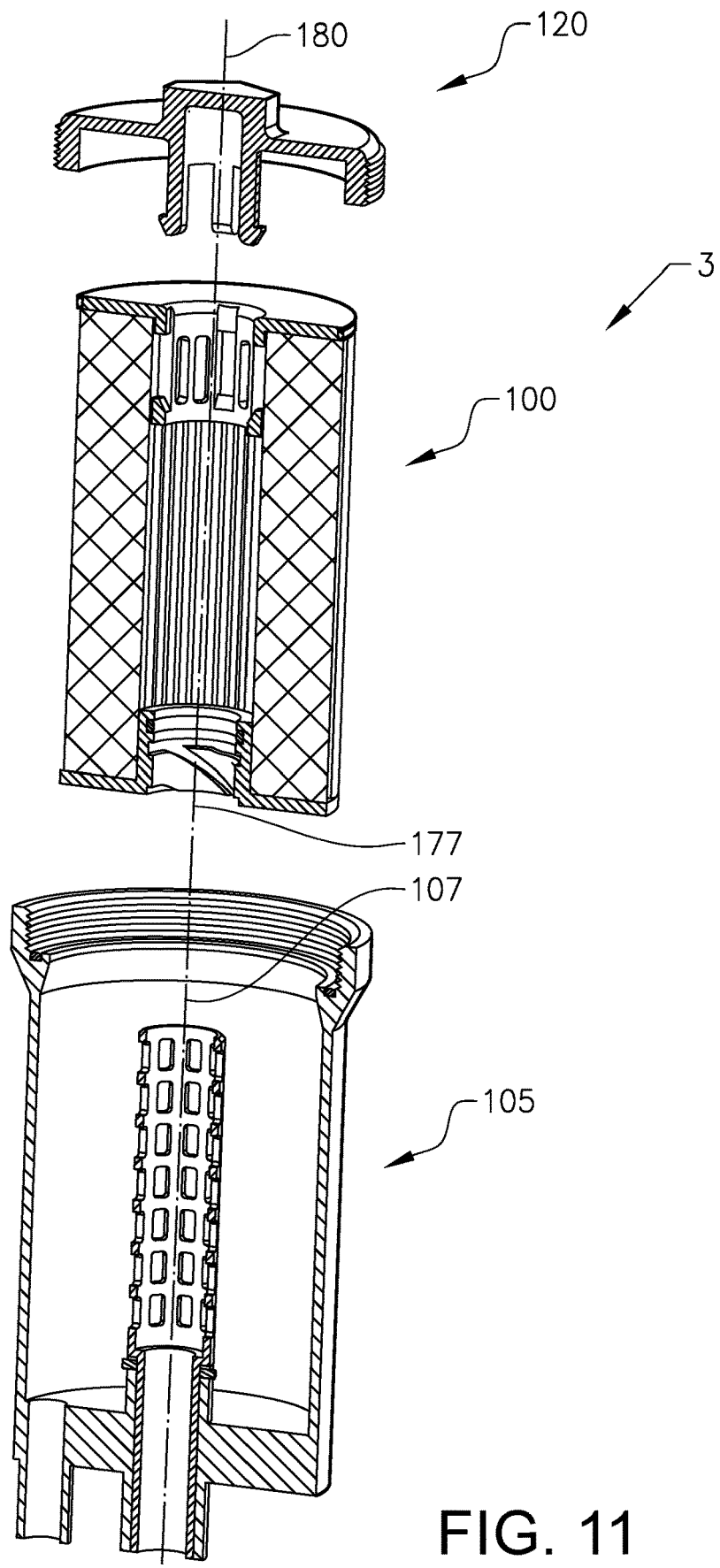
FIG. 11 is an exploded view of a filter arrangement according to a first embodiment example comprising the filter insert, lid and filter housing according to FIGS. 4-10.
Figure 12:
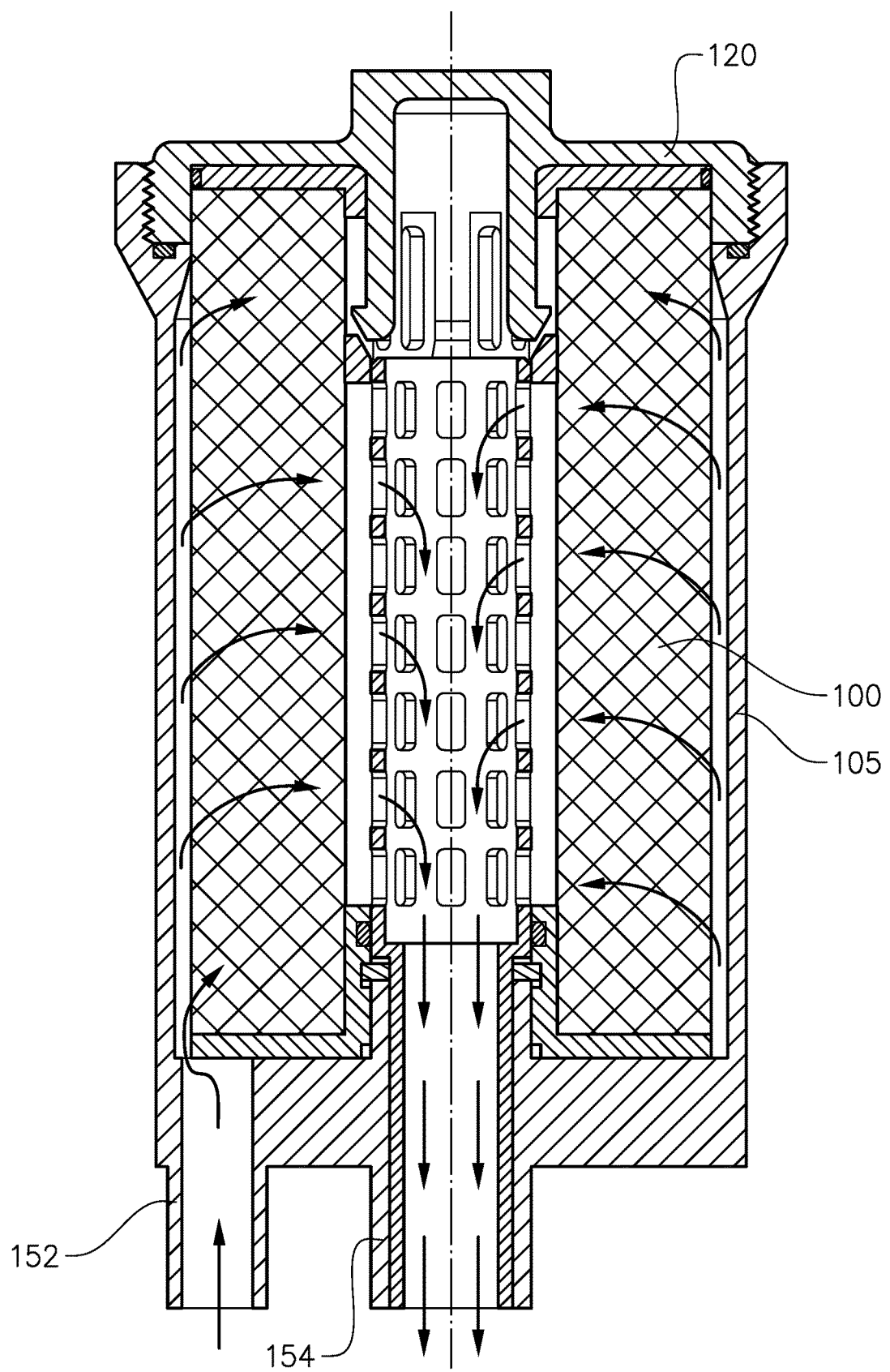
FIG. 12 is a cross sectional view of the filter arrangement according to FIG. 10.

Further, the lid 120 comprises a first fastening means 136 for engagement with a second fastening means 138 of the filter housing 105, see FIGS. 10-12 for removably fastening the filter housing lid 120 to the filter housing 105. More specifically, the lid 120 comprises a circular wall 137 projecting axially from a periphery of the plate shaped portion 122 so that it encompasses the second connection means 124. The first fastening means 136 is formed in said circular wall 137. The wall 137 is formed in a one-piece unit with the plate shaped portion 122.

The first fastening means 136 and the second fastening means 138 are arranged to allow a relative axial movement between the filter housing lid 120 and the filter housing 105 a predetermined second distance during engagement of the first fastening means 136 and the second fastening means 138. The first fastening means 136 forms a threaded structure. The threaded structure 136 is formed on one side surface of the said circular wall 137. The threaded structure 136 has a second pitch to allow a relative axial movement between the filter housing lid 120 and the filter housing 105. The first pitch is higher than the second pitch so as to control movement of the filter insert relative to the filter housing lid when the first connection means 114 is in engagement with the second connection means 124 and the first retaining means 104 is in engagement with the second retaining means 130.

Figure 9:
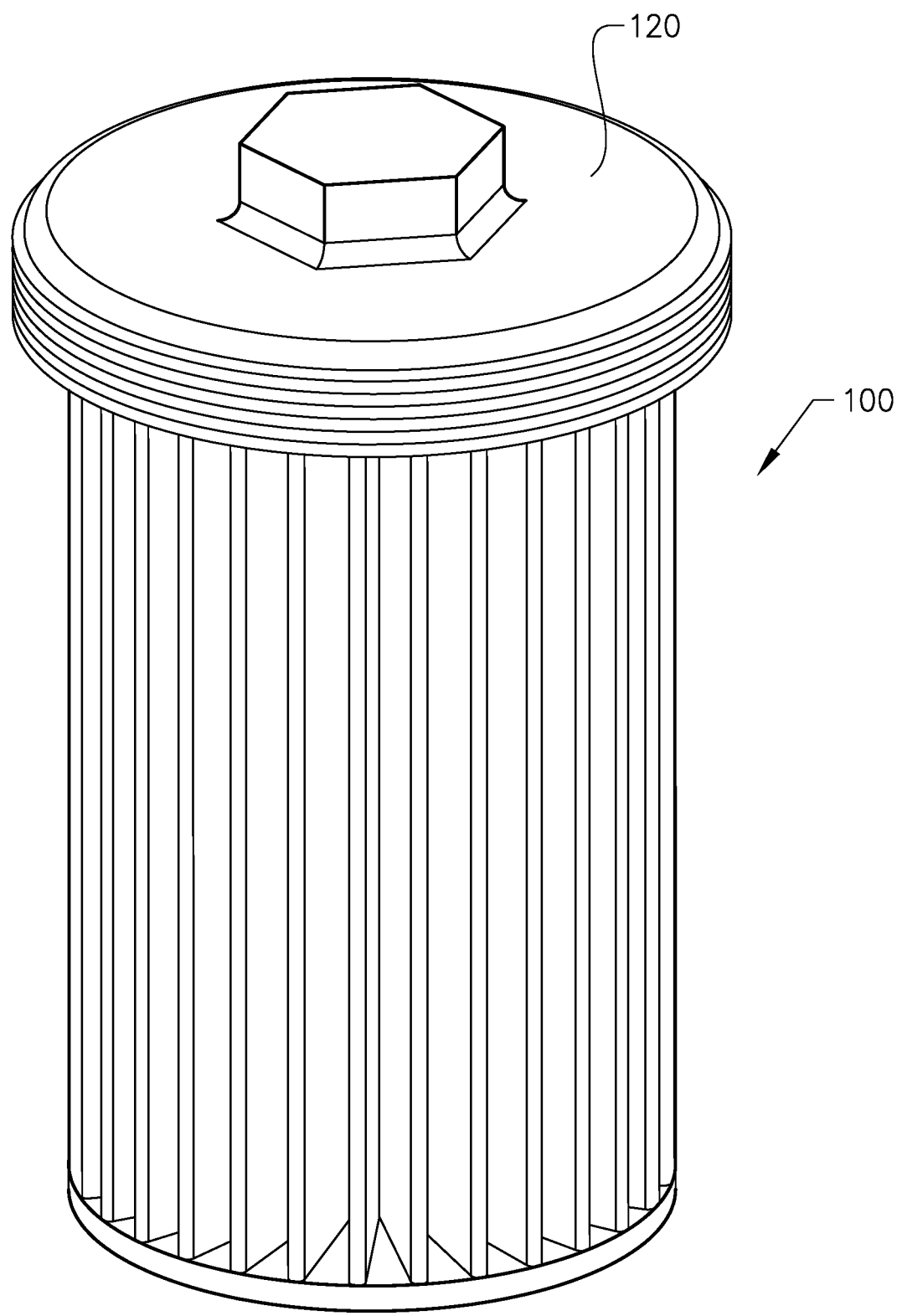

FIG. 9 discloses the lid 120 according to the first embodiment example attached to the filter insert 100 according to the first embodiment example.

FIG. 10 is a partially cut perspective view from the top of the filter housing 105 according to a first embodiment example. The filter housing 105 has a cylindrical inner wall 188 with a circular cross section. The diameter of the circular cylindrical wall 188 is matched to the outer periphery of the filter material body 102 establishing a gap between them.

The filter housing 105 comprises an inlet 152 for receipt of a raw fluid to be filtered, which empties into a raw side of the filter housing, and an outlet or return 154, which starts at a clean side of the filter housing, for filtered clean fluid. The inlet 152 and outlet 154 are provided in a lower region 156 of the filter housing 105. The inlet 152 and outlet 154 are in communication with different sides of the filter material body 102. The filter housing 105 further comprises a fluid permeable tubular central post 143 for being received in the central opening in the filter insert 100. The central post 143 is grid-shaped. More specifically, the outset 154 is provided in a bottom wall 158 of the filter housing and positioned radially centrally and adapted to match the position of the central opening in the fluid permeable central post 143. The outlet 154 is thus in fluid communication with an interior side of the fluid permeable tubular central post 143. Further, the inlet 152 is positioned radially eccentric in the bottom wall 158 of the filter housing for distributing the fluid to a radially external side of the filter material body 102. The direction of the fluid inside the filter arrangement is disclosed in FIG. 12. By flowing through the filter material body 102, the liquid flows to the clean side of the filter housing (the radially interior space) while dirt particles are retained in the filter material body 102. The filtered liquid flows off through the (return) 154.

Further, the filter housing 105 comprises a second fastening means 138 for engagement with the first fastening means 136 for removably fastening the filter housing lid 120 to the filter housing 105. The second fastening means 138 is formed complimentary in shape and structure to the first fastening means 136. More specifically, the second fastening means 138 comprises a threaded structure for engagement with the threaded structure of the first fastening means 136.

Figure 10A:
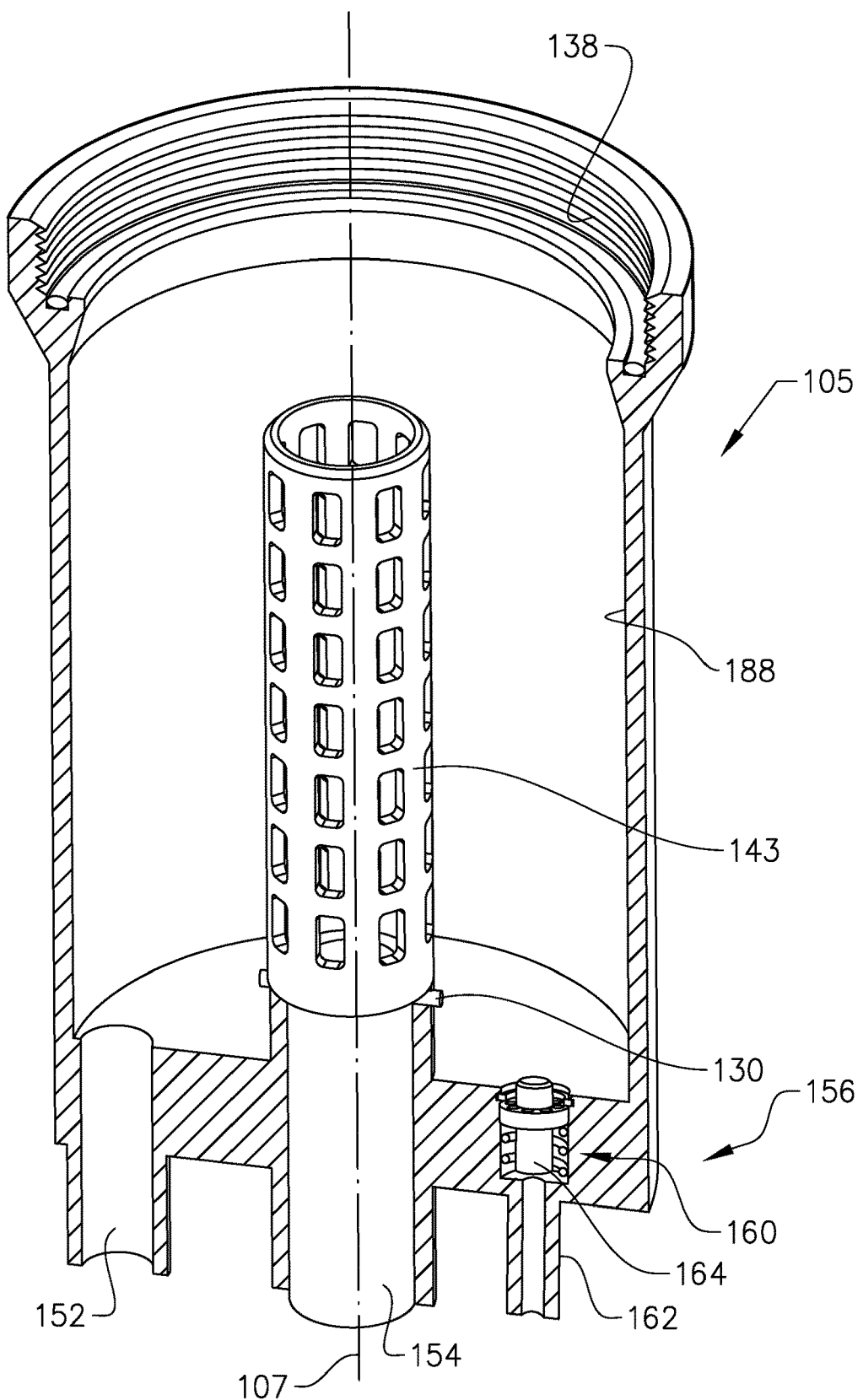
FIG. 10a is a partially cut perspective view from the top of the filter housing according to FIG. 10 further showing a drainage valve.

Further, the filter housing 105 comprises the drainage means 160, see FIG. 10a, in the lower region 156 of the filter housing 105 and specifically in a bottom wall of the filter housing 105. The drainage means 160 is positioned radially eccentric in the bottom wall of the filter housing and adapted to be actuated by a lower surface of the second end wall 110 of the filter insert 100. The filter housing 105 furthermore has a drain outlet 162 in communication with the drainage means 160, through which an emptying of the filter housing is carried out in response to a replacement of the filter insert.

The drainage means 160 comprises a spring-biased member 164 arranged in an opening in the bottom wall of the filter housing 105. The member 164 is urged via the spring to project axially from the bottom end wall into a filter insert reception space of the filter housing 105, wherein a drainage valve associated to the spring-biased member 164 is at a distance from its associated seat. The seat may be incorporated in the filter housing wall or may be inserted as a separate part matching the member 164. The drainage means 160 is then open to the drain outlet 162. The member 164 is arranged to be axially displaceable in the filter housing 105. More specifically, the member 164 is arranged to be moveable in parallel with the longitudinal direction 107 of the filter housing 105 between two axially spaced end positions. An upper, free end of the spring-biased member 164 is adapted to be actuated by the second end wall 110 of the filter insert 100 when the filter insert 100 is in an operational position in the housing 105, thereby closing the drainage valve.

During insertion of a new filter insert 100 into the housing 105, the filter insert 100 is first attached to the lid 120 and the lid 120 is then attached to the filter housing 105, wherein the filter insert 100 is moved axially (and simultaneously circumferentially) towards its operational position. When the lid 120 is tightly screwed to the filter housing 105, the blocking element 147 is pressed tightly against the seat 149 while compressing the spring means 151. The spring-biased member 164 will actuated by the second end wall 110 of the filter insert 100 when the filter insert 100 is close to its operational position in the housing 105, wherein the spring-biased member 164 will be moved axially while the spring is gradually compressed and the drainage valve will close when the filter insert 100 reaches its operational position in the housing 105.

During removal of the filter insert 100 from the filter housing 105, the spring will urge the member 164 upwards, wherein the drain outlet 162 is opened and the liquid located in the filter housing can flow off through the drain outlet, in the case of an oil filter, for example into the oil sump of a corresponding internal combustion engine. A mostly liquid-free filter insert 100 can then be removed from the filter housing 105.

FIG. 11 is an exploded view of the filter arrangement 3 according to the first embodiment example comprising the filter insert 100, lid 120 and filter housing 105 according to FIGS. 1-10.

FIG. 13 discloses consecutive relative positions of the filter insert 100, lid 120 and housing 105 during insertion and removal according to a first alternative.

FIG. 13a discloses the filter insert 100 connected to the lid 120 in a position above the housing 105 and vertically in line with the access opening. The snap means 112, 124 are designed with such a radial match that a friction between contacting surfaces is enough for maintaining a certain distance between an upper edge of the radially projecting portion 179 of the fingers 125 and the upper axial stop 113, see also FIGS. 4 and 8, when the filter insert 100 hangs below the lid 120. According to an alternative, the snap means 112, 124 may be designed so that there is a step indicating this intermediate position for maintaining a set distance between an upper edge of the radially projecting portion 179 of the fingers 125 and the upper axial stop 113. Such a step may be realized in that the opening 121 is provided with a crest in a position between the axial end stops 11,113 forming a seat for the finger 125. The unit comprising the lid 120 and the filter insert 100 is preferably operated holding only the lid 120.

The unit 110,120 is then moved so that its centre axis is in parallel with the longitudinal direction 107 of the housing 105, see FIG. 13b, without any rotation so that the filter insert 100 is received in the access opening of the filter housing 105. The axial movement of the unit is continued until the threading 136 of the lid 120 contacts the corresponding threading 138 of the housing 105, see FIG. 13c and FIGS. 8 and 10. The radial projection 130 of the filter housing 105 will enter the first groove 113 of the filter insert, see FIG. 5b and FIG. 10, simultaneously as the threading 136 of the lid 120 contacts the corresponding threading 138 of the housing 105, or after a certain rotation of the lid 120. The lid 120 is then rotated relative to the filter housing 105 for engaging the threadings 136,138, wherein the unit of the filter lid 120 and the filter insert 100 continues to move axially downwards, see FIG. 13d.

During the consecutive rotation of the lid 120, the filter insert 100 will be guided by the groove 113 and thereby move axially downwards relative to the lid 120 dictated by that the pitch of the groove 113 is higher than the pitch of the threadings 136,138. Thus, the fingers 125 of the lid will slide axially upwards relative to the axial slots at the upper section of the filter insert as the filter insert 100 is pulled downwards via the retaining means 104.

Figure 5B:
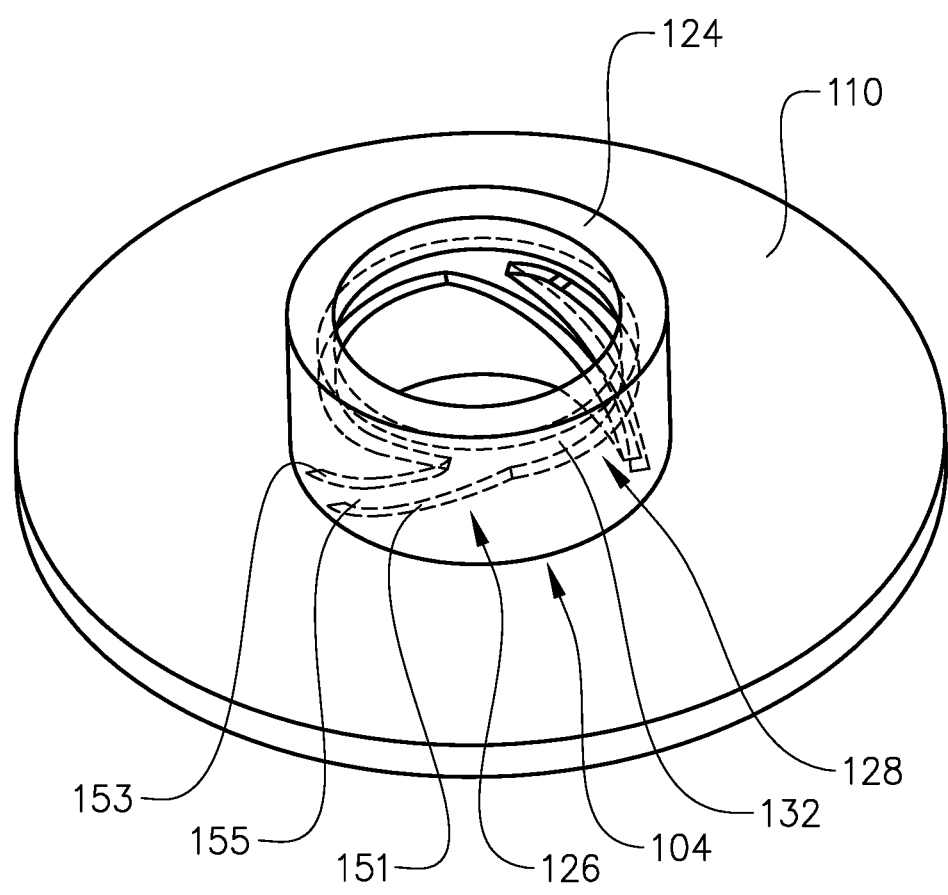
FIG. 5b is a perspective view from the top of a lower panel of the filter insert according to the first embodiment example.

When the lid have rotated a certain angle, for example half a turn, the radial projection 130 of the filter housing 105 reaches the second groove 132, see FIG. 13d and 5b. The radial projection 130 of the filter housing 105 will then follow the second groove and the filter insert will consequently move solely circumferentially relative to the housing upon further rotation of the lid 120. Thus, the lid 120 will be moved axially downwards relative to both the filter insert 100 and the housing 105. The lid 120 will be tightened to the housing 105 via further rotation of the lid 105 until the threadings 136,138 is fully engaged, see FIG. 13e.

During a filter insert removal, the lid is rotated in an opposite direction in relation to the insertion direction, see FIG. 13f, wherein the projection 130 follows the second groove 132 and the filter insert 100 is consequently moved solely in a circumferential direction relative to the housing 105 until the projection 130 reaches the entry to the first groove 155. In FIG. 13f, the lid 120 have been rotated approximately a complete turn. The projection 130 reaches the entry to the first groove 155 during the course of this turn and the lid 120 is in FIG. 13f illustrated in a position where the projection 130 has already passed the first groove 155.

When the projection 130 enters the first groove 155, the filter insert will start to move axially upwards relative to the lid due to the fact that the pitch of the groove 130 is higher than the pitch of the threadings 136,138. When the projection 130 leaves the first groove 155, the filter insert 100 will not move axially relative to the lid 120 anymore, but instead move in unison with the lid, see FIG. 13g during a last part of the rotation for disconnecting the threadings 136,138. The filter insert 100 can then be axially moved upwards from the filter housing 105, see, FIG. 13h to a position, in which it is completely removed from the housing 105, see FIG. 13i.

FIG. 14 discloses consecutive relative positions of the filter insert 100, lid 120 and housing 105 during insertion and removal according to a second alternative.

FIG. 14a discloses the filter insert 100 connected to the lid 120 in a position above the housing 105 and vertically in line with the access opening. The filter insert 100 hangs, below the lid 120, wherein the upper edge of the radially projecting portion 179 of the fingers 125 engage the upper axial stop 113, see also FIGS. 4 and 8. Thus, the weight of the filter insert 100 will bring the upper edge of the radially projecting portion 179 of the fingers 125 in contact with the upper axial stop 113. The unit comprising the lid 120 and the filter insert 100 is preferably operated holding only the lid 120.

The unit is then moved in parallel with the longitudinal direction of the housing 105, see FIG. 14b, without any rotation so that the filter insert 100 is inserted into the access opening of the filter housing 105. The axial movement of the unit is continued until the radial projection 130 of the filter housing 105 will reach the lower panel 110, see FIG. 14c and FIGS. 8 and 10, and then a rotation of the lid will make the projection 130 enter the first groove 155 of the filter insert.

During the consecutive rotation of the lid 120, the filter insert 100 will be guided by the groove 155 and thereby move axially downwards dictated by the pitch of the groove 155. When the projection 130 reaches the second groove 132, it will follow the second groove and the filter insert will consequently move solely circumferentially upon further rotation of the lid 120. Note that the threadings 136 of the lid has not yet reached the complimentary threadings 138 of the filter housing in FIG. 14d.

When the filter insert 100 has reached its lowermost, operational position in the housing 105, the threading 136 of the lid 120 will contact the corresponding threading 138 of the housing 105. The rotation of the lid 120 relative to the filter housing 105 may thus be continued for engaging the threadings 136,138, wherein the axial movement is dictated by the pitch of the threadings 136,138. The lid 120 will be tightened to the housing 105 via further rotation of the lid 105 until the threadings 136,138 is fully engaged, wherein the lid 120 moves axially relative to the filter insert 100, see FIG. 14e.

During a filter insert removal, the lid 120 is rotated in an opposite direction in relation to the insertion direction. The lid 120 is first rotated relative to the housing 105 dictated by the threadings 136,138, wherein the lid 120 moves axially relative to both the filter housing 105 and the filter insert 100. The projection 130 follows the second circumferential groove 132 during that movement, wherein the filter insert 100 is consequently moved solely in a circumferential direction relative to the housing 105. According to one example, a spring means (not shown) may be provided acting between the lid 120 and the upper end panel 108 urging them away from each other for securing that the filter insert 100 is maintained in its lower position, rotating freely, until the unscrewing of the lid 120 controlled by the engagement of the threadings 136,138 is completed. The spring means may be attached to one of the lid 120 and the upper end panel 108. Upon further rotation of the lid 120, the threadings 136,138 are disengaged, see FIG. 14f. Upon further rotation of the lid 120, the projection 130 will reach the entry to the first groove 155, see FIG. 14g. When the projection 130 enters the first groove 155, the filter insert will start, to move axially upwards relative to the filter housing 105 dictated by the pitch of the first groove 155. When the projection 130 leaves the first groove 155, the filter insert 100 is free of any rotational engagement, see FIG. 14h, and the lid may consequently be moved axially upwards from the filter housing 105 without any further rotation, see FIG. 14i.

Figure 15:
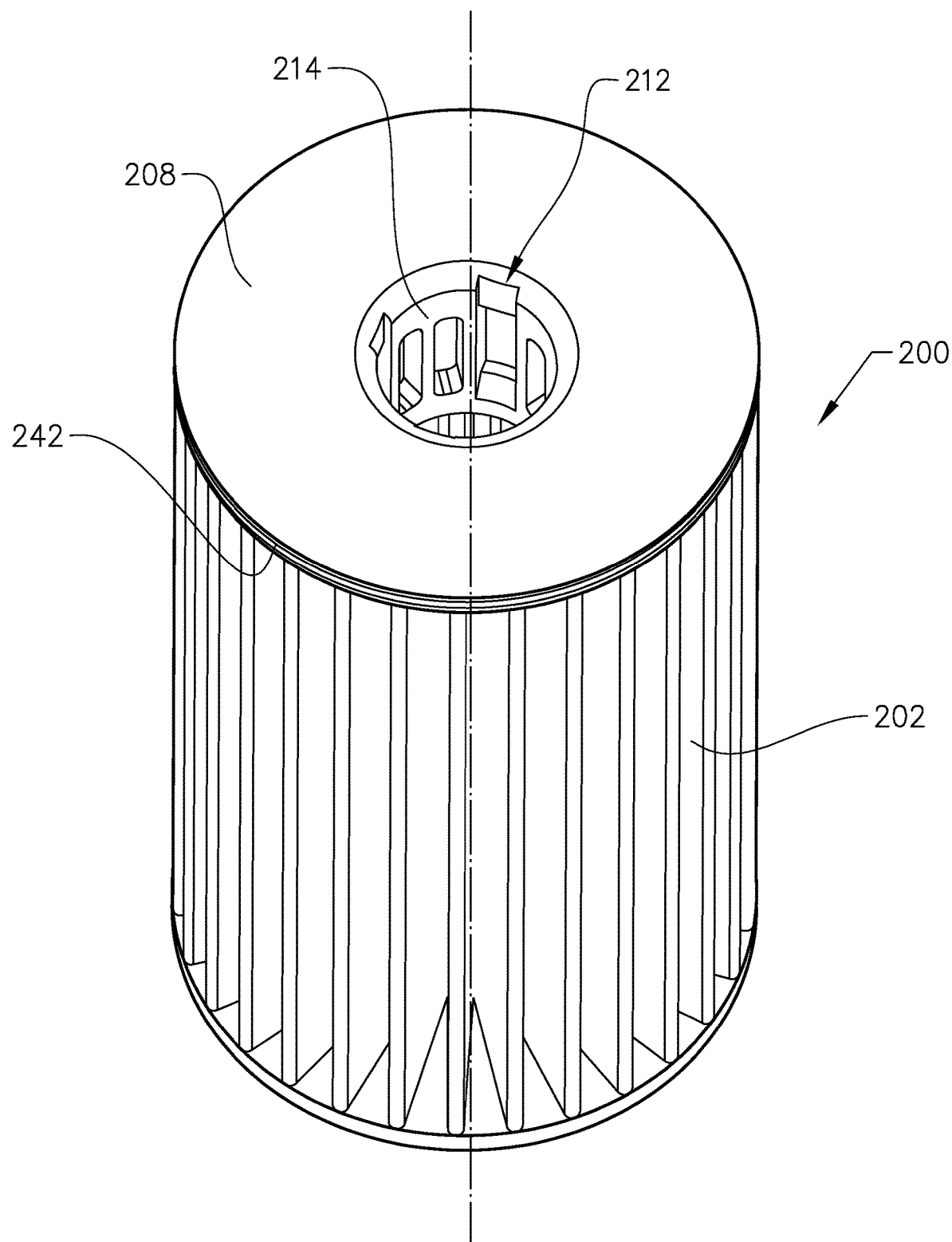
FIGS. 15-16 shows a perspective view from the top and bottom, respectively, of a filter insert according to a second embodiment example.
Figure 16:
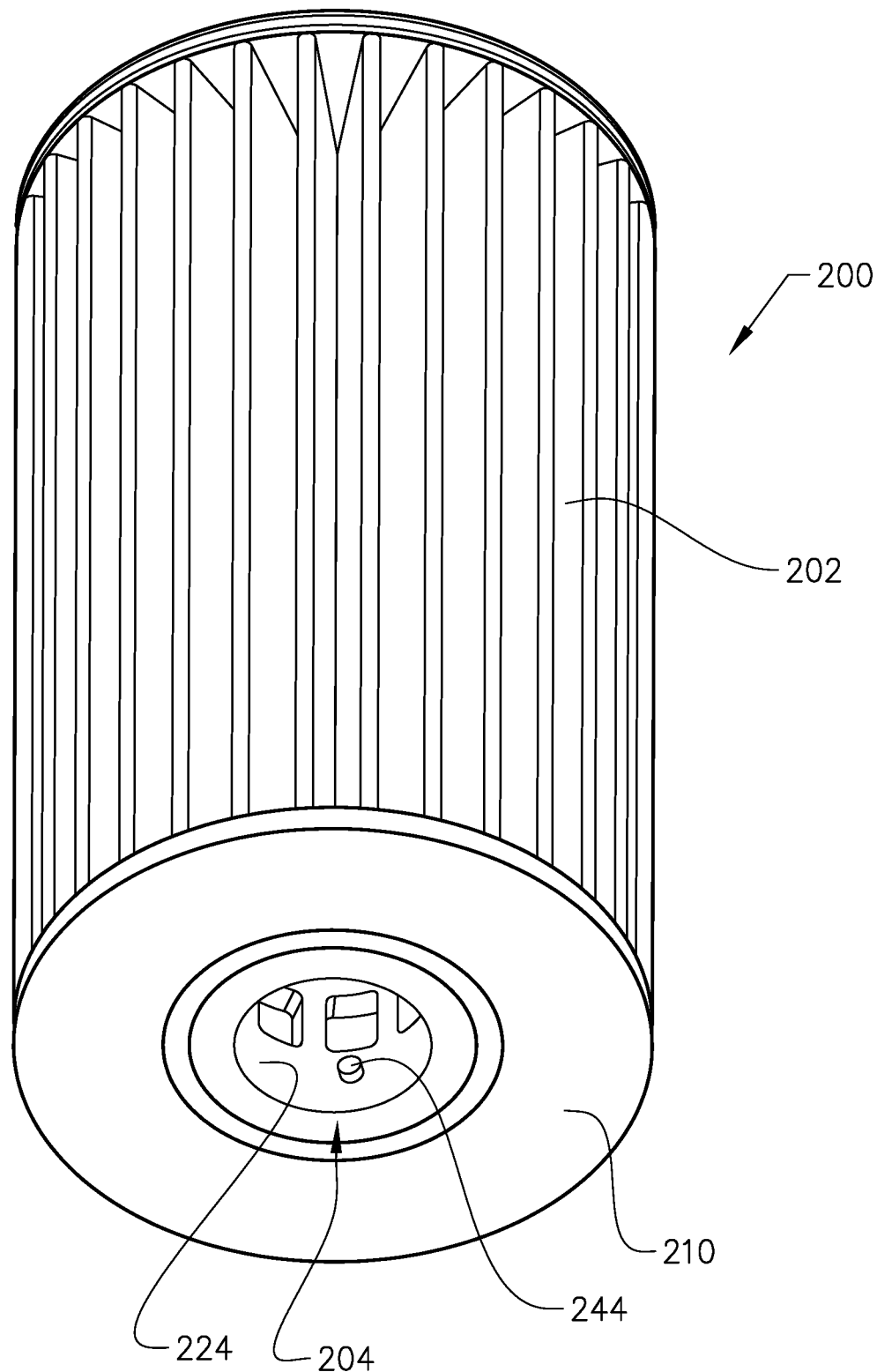

FIG. 15-16 shows a perspective view from the top and bottom, respectively, of a filter insert 200 according to a second embodiment example. Only the main differences in relation to the first embodiment example will be mentioned below. The filter insert 200 comprises a first retaining means 204 arranged for engaging a corresponding second retaining means 230 of a filter housing 205, see FIGS. 19-20 and wherein the retaining means is arranged for guiding the filter insert 200 during movement relative to the filter housing. The first retaining means 204 comprises a radially extending projection 244 for sliding engagement with an inclined surface 209,211 of the filter housing 205. More specifically, the first retaining means 204 comprises a plurality of circumferentially spaced such projections 244. Preferably, the projections 244 are equally spaced in the circumferential direction. In the example shown, two projections 244 are shown, which are positioned 180 degrees from each other.

The filter insert 200 comprises a filter material body 202 and wherein the first retaining means 204 is arranged at a circumference of the filter material body. The filter insert 200 further comprises an upper and lower panel 208,210. Thus, the filter material body 202 is delimited on the top by the upper panel 208 and on the bottom by the lower panel 210 similar to what has been described above with regard to the first embodiment example. Each of the upper and lower panel 208,210 comprises a tubular structure 214,224 projecting inwards into the central cavity of the filter insert 200 and is each formed in a one piece unit with its associated tubular structure. The radially extending projection 204 projects radially inwards from the tubular structure 224.

The filter insert 200 further comprises a first connection means 212 for engaging a corresponding second connection means 124 of the filter housing lid 120 for a connection to the filter housing lid similar to what has been described above with regard to the first embodiment example.

Figure 20:
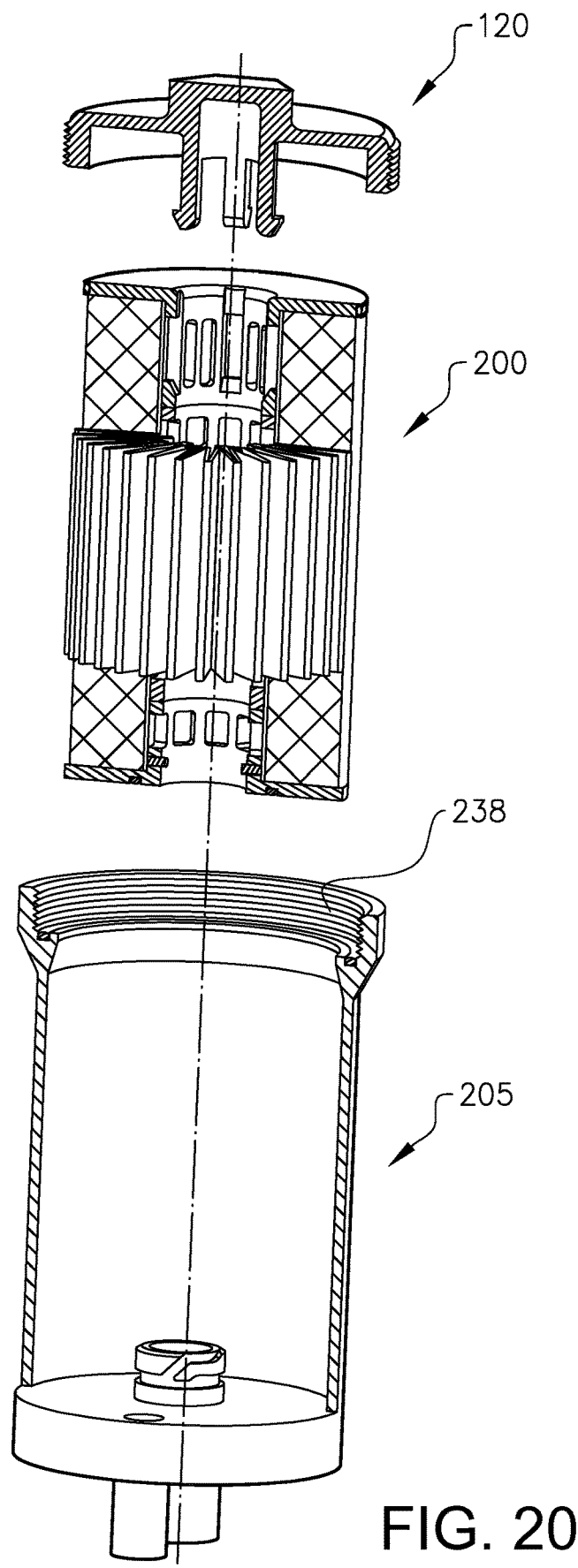
FIG. 20 is an exploded view of a filter arrangement according to a second embodiment example comprising the filter insert, lid and filter housing according to FIGS. 15-19.

Further, the filter housing 205 comprises a second fastening means 238, see FIG. 20, for engagement with the first fastening means 136 for removably fastening the filter housing lid 120 to the filter housing 105 similar to what has been described above with regard to the first embodiment example.

Figure 17:
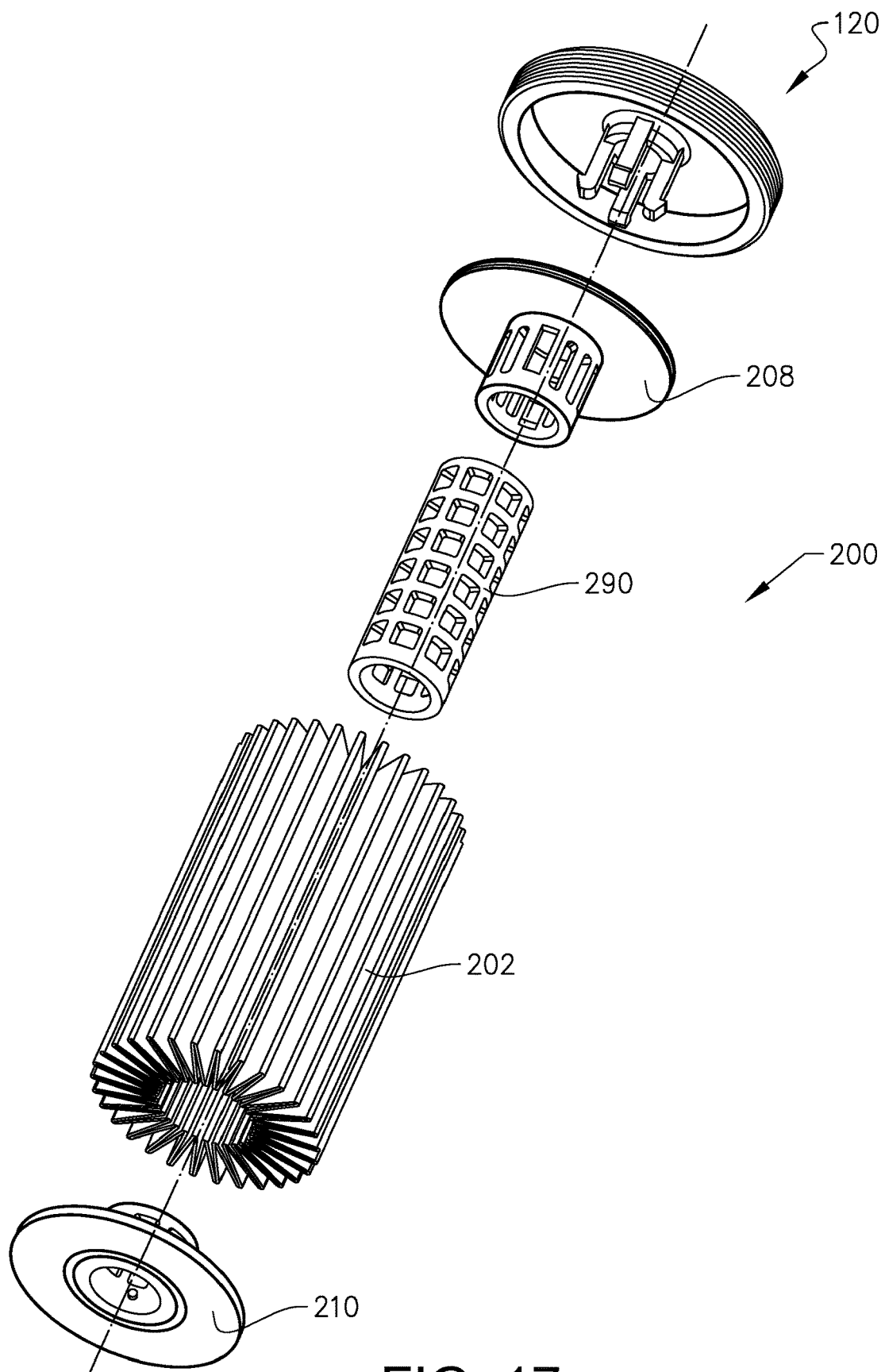
FIG. 17 is an exploded perspective view of the filter insert according to the second embodiment example and the housing lid according to the first embodiment example.

FIG. 17 is an exploded, perspective view of the filter insert 200 and lid 120. The filter insert 200 comprises a fluid permeable central tubular column 290, which is positioned internally of the filter material body 202 and preferably in close contact with the inner peripheral surface of the filter material body 202 for reinforcing the filter insert 200 and reducing risk of collapse during operation. Further, the fluid permeable central tubular column 290 is grid-shaped. Further, the fluid permeable central tubular column 290 may be rigidly attached to each of the end panels 208,210 for increased rigidity.

Figure 18:
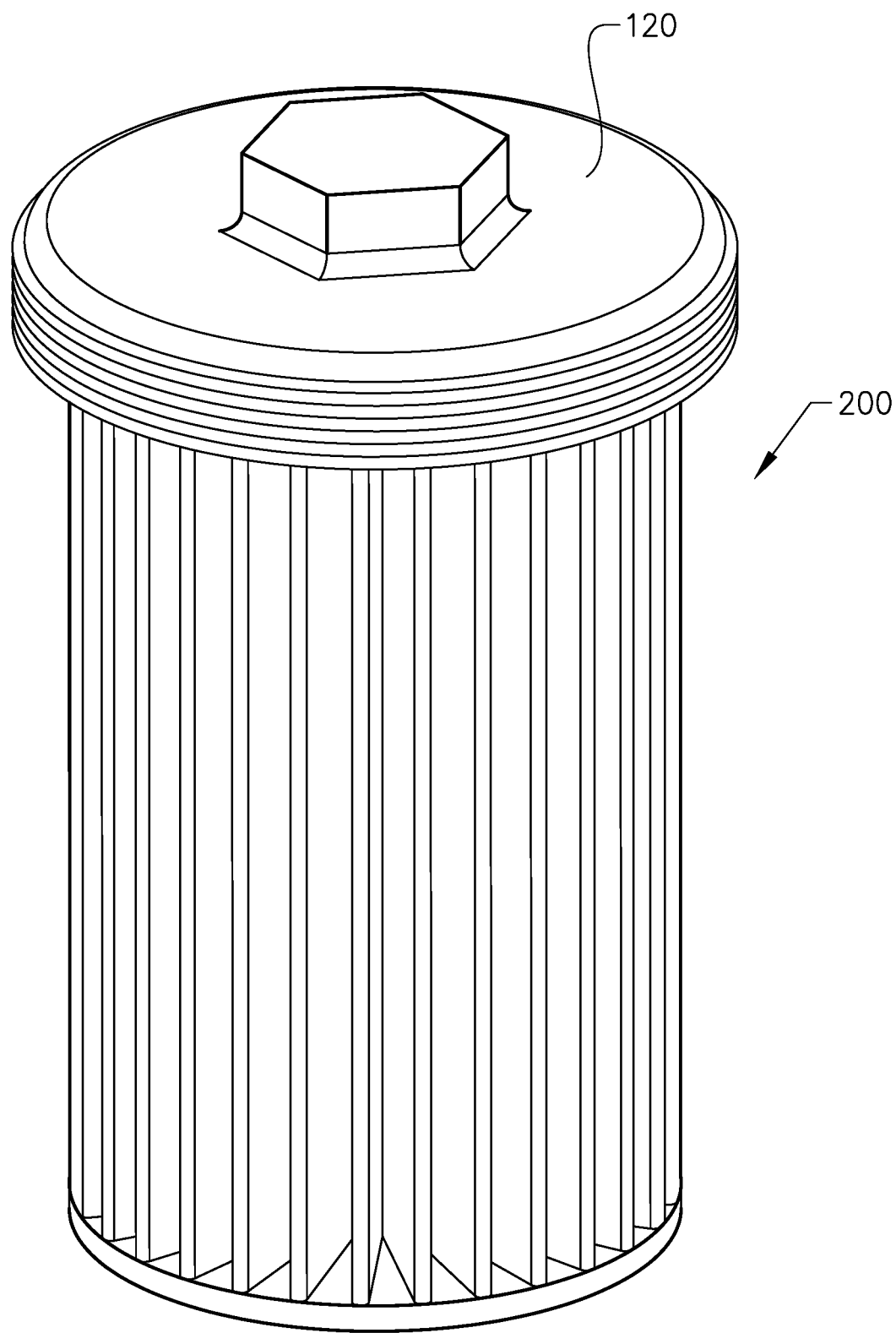
FIG. 18 shows the filter insert and the lid according to FIG. 17 in an assembled state.

FIG. 18 discloses the lid 120 according to the first embodiment example attached to the filter insert 200 according to the second embodiment example.

Figure 19:
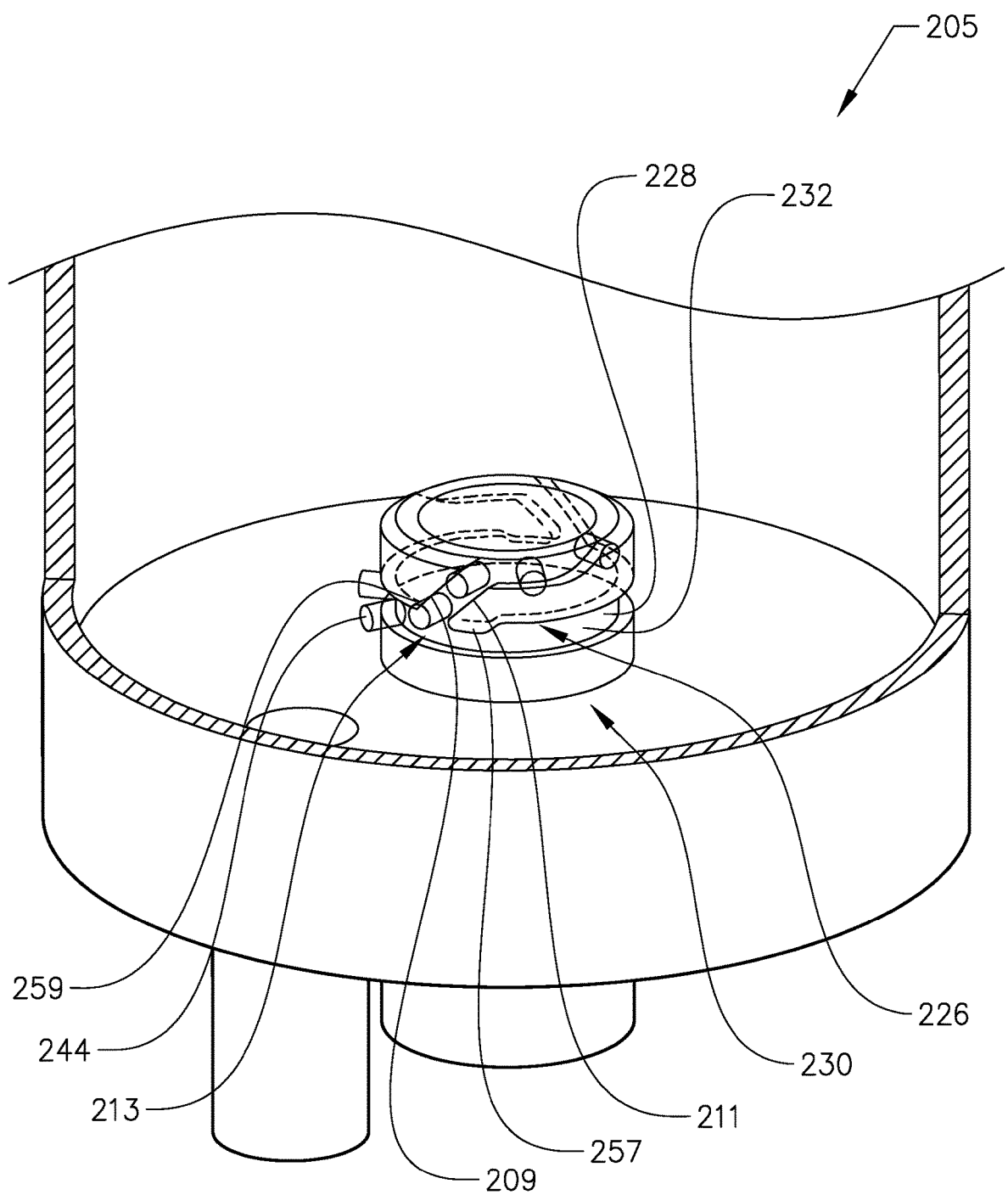
FIG. 19 is a partially cut perspective view from the top of a filter housing according to a second embodiment example, wherein different positions of projection of the filter insert during removal is shown.

FIG. 19 is a partially cut perspective view from the top of a filter housing 205 according to a second embodiment example. Only the main differences in relation to the first embodiment example will be mentioned below. The filter housing 205 comprises a second retaining means 230. A first section 226 of the second retaining means 230 comprises at least one inclined surface 209,211 extending in a circumferential direction and an axial direction for receiving the radially extending projection 244 provided in the filter insert 200. In the shown example, two inclined surface 209,211 are provided, which face each other and define a first groove 213. Thus, the first section of the second retaining means 230 forms a threaded structure. The first section has a first pitch. Different positions of the projection 244 of the filter insert during a removal operation is shown. The projection 244 glides along the upper surface 209 during the removal operation.

The second retaining means 204 has a second section 228 in communication with the first section 226 for guiding the filter insert 200 in a circumferential path with substantially no pitch. The second section 228 forms a second groove 232 with an extension in a circumferential direction. The first and second sections 226,228 are in direct communication with each other. Thus, one end of the first groove 213 is open to the second groove 232. One side wall 257 of the entrance to the first groove 213 from the second groove 232 is projecting axially in relation to the other side wall 259 for facilitating that the radially extending projection 244 finds the entrance during rotation of the filter insert 200 for removal of the filter insert. Further, the first section 226 is positioned closer to a filter insert access opening in the housing than the second section 228.

Figure 20B:
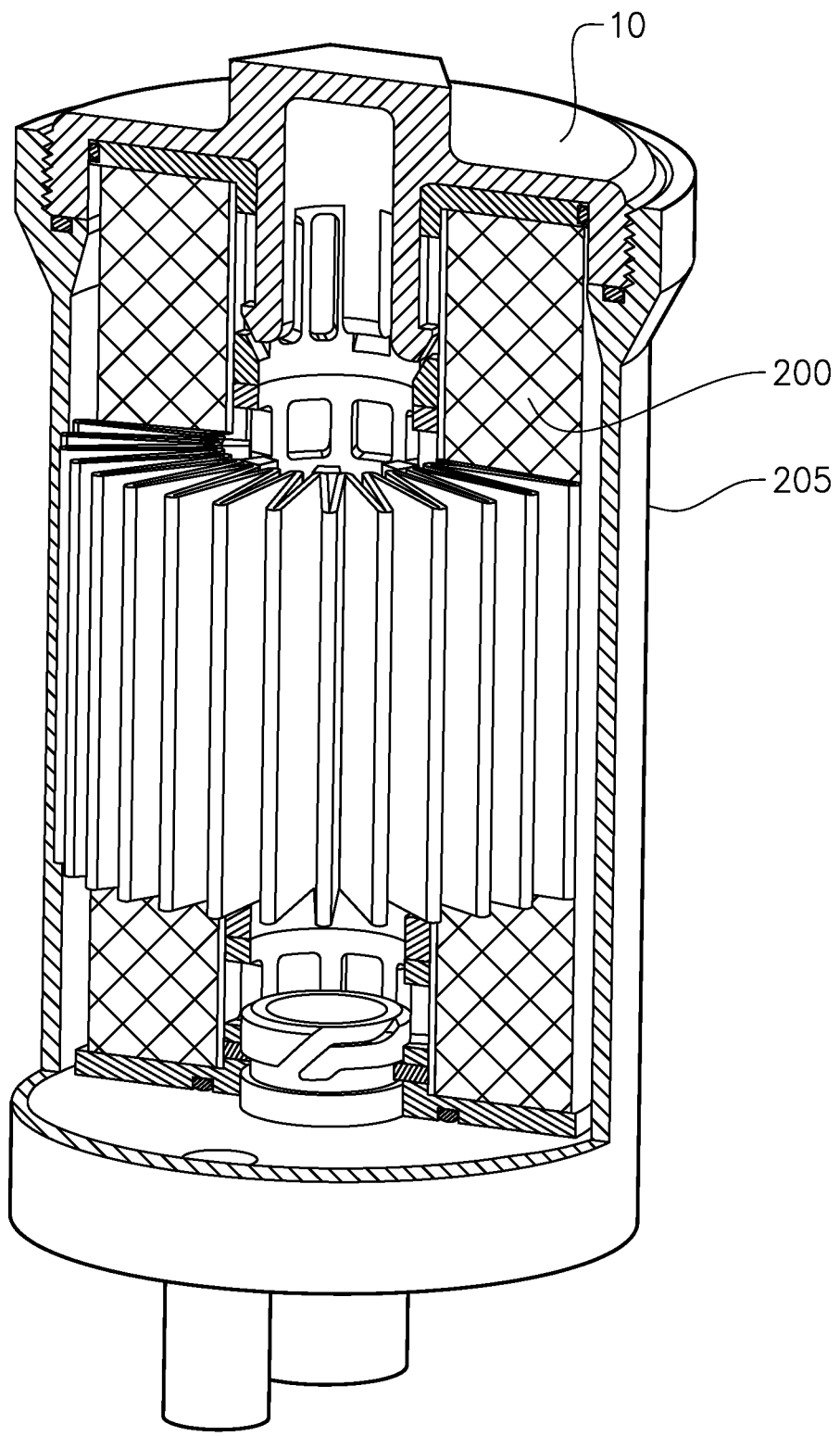
FIG. 20b shows the filter arrangement according to the second embodiment example according to FIG. 20 in an assembled state.
Figure 21:
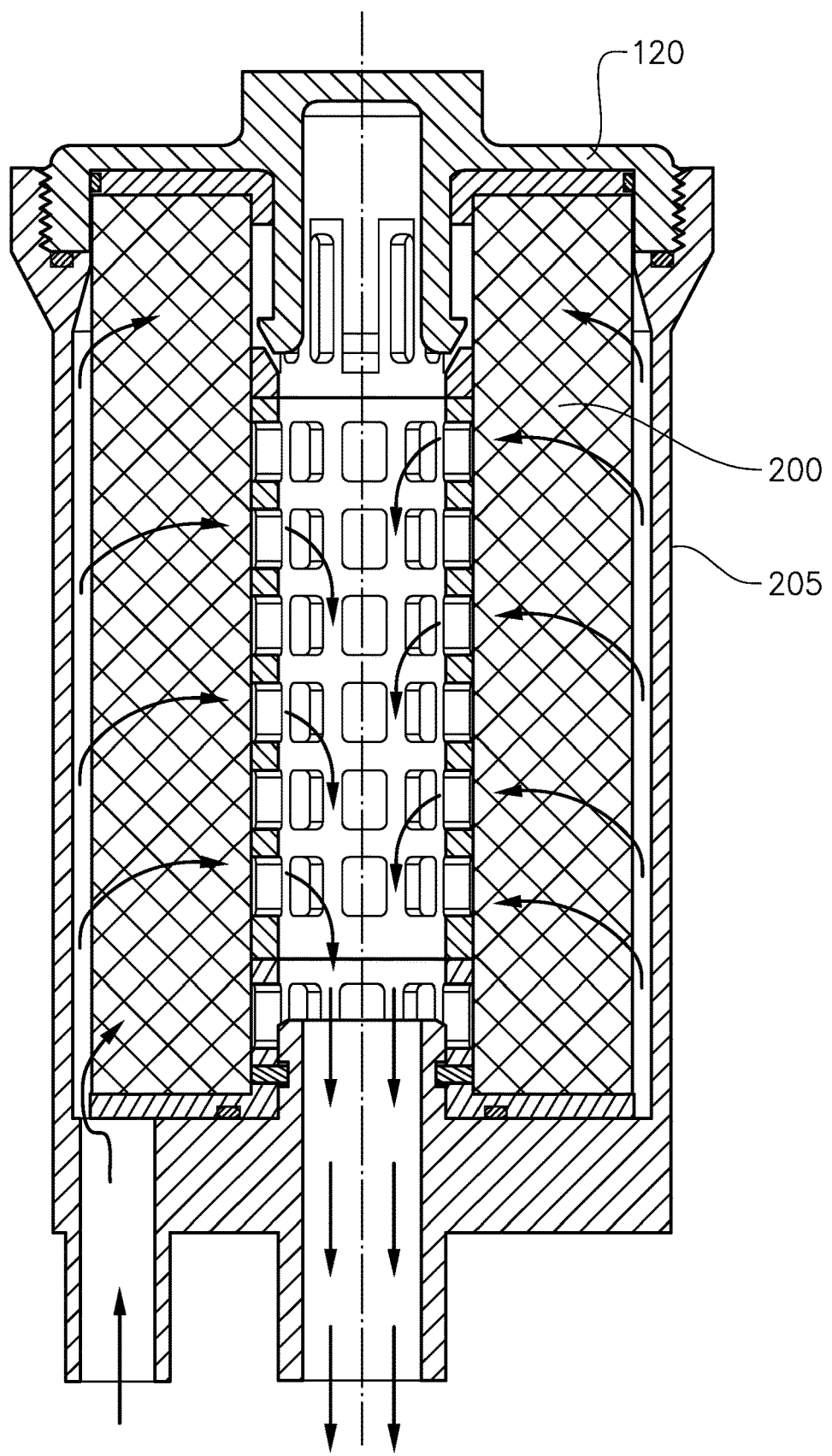
FIG. 21 shows the filter arrangement according to the second embodiment example according to FIG. 20 in cross section.

FIG. 20 discloses the lid 120 according to the first embodiment example, the filter insert 200 according to the second embodiment example and the housing 205 according to the second embodiment example in an exploded view. FIG. 20b shows a partly cut perspective view of the filter arrangement according to FIG. 20 in an engaged state. The direction of the fluid inside the filter arrangement is disclosed in FIG. 21.

It is to be understood that the present invention is not limited to the embodiments described above and illustrated in the drawings; rather, the skilled person will recognize that many changes and modifications may be made within the scope of the appended claims.

According to one alternative embodiment, the filter insert retaining means is provided on an outer circumference of the filter material body. Thus, the filter insert retaining means is provided on a radially outer surface of the filter material body. In other words, the filter insert guiding means is provided on a surface of the filter material body exposed radially outwards. Further, the complimentary retaining means in the filter housing is then provided on an inner circumferential wall of the filter housing. This is especially advantageous in that the guiding means is provided on a maximum diameter creating conditions for a robust control of the movement of the filter insert relative to the filter housing.

Further, the fastening means for fastening the lid to the housing may differ from a threaded structure but still adapted for a relative rotational or at least turning movement. According to one alternative embodiment, the fastening means is adapted for fastening the lid to the housing via two consecutive movements comprising a relative axial movement and a relative turning or rotational movement. Such a fastening means may be embodied via a bayonet catch connection.

The invention claimed is:

1. A filter insert for being removably arranged in a filter housing wherein the filter insert comprises:
   a first connection means for engaging a corresponding second connection means of a filter housing lid for a connection to the filter housing lid;
   a filter material body having a cylindrical shape; and
   an upper plate shaped panel arranged to delimit the filter material body at one of its axial ends, wherein the first connection means is integrally formed with the upper plate shaped panel,
   wherein the first connection means comprises a wall portion with at least one radial opening for receipt of a projection extending from the lid to allow a relative axial movement between the filter insert and the filter housing lid for only a predetermined first distance, and wherein sections of the wall portion at opposite ends of the radial opening in the axial direction defines axially spaced stops for limiting the relative axial movement between the filter insert and the filter housing lid to predetermined first distance, and wherein the radial opening is arranged to simultaneously prevent a relative rotational movement between the filter insert and the filter housing lid.

2. A filter insert according to claim 1, wherein the first connection means is arranged for a snap connection between the filter insert and the filter housing lid.

3. A filter insert according to claim 1, wherein the filter insert comprises a tubular structure and wherein the first connection means forms a part of the tubular structure.

4. A filter insert according to claim 1, wherein the filter insert comprises a first retaining means arranged for engaging a corresponding second retaining means of the filter housing and wherein the second retaining means is arranged for guiding the filter insert during movement relative to the filter housing.

5. A filter insert according to claim 4, wherein the first retaining means is adapted for guiding the filter insert along a path, which has an axial component and a circumferential component relative to the filter housing.

6. A filter insert according to claim 5, wherein the filter insert is arranged to move axially relative to the filter housing lid is engagement of the second connection means when the first retaining means is in engagement with the corresponding second retaining means of the filter housing for movement of the filter insert along path.

7. A filter insert according to claim 4, wherein the first retaining means is positioned axially spaced from the first connection means.

8. A filter insert according to claim 4, wherein the first retaining means is formed by at least one radially extending projection for engagement with an inclined surface provided in the filter housing.

9. A filter insert according to claim 4, wherein the first retaining means is formed by at least one inclined, surface extending in a circumferential direction and an axial direction for receiving a radially extending projection provided in the filter housing.

10. A filter insert according to claim 4, wherein the filter insert comprises a tubular structure and wherein the first retaining means forms a part of the tubular structure.

11. A filter insert according to claim 4, wherein the filter insert comprises the filter material body and wherein the first retaining means is arranged at a circumference of the filter material body.

12. A filter arrangement comprising:
a filter insert for being removably arranged in a filter housing, wherein the filter insert comprises
a first connection means,
a filter material body having a cylindrical shape, and
an upper plate shaped panel arranged to delimit the filter material body at one of its axial ends, wherein the first connection means is integrally formed with the upper plate shaped panel; and
a filter housing lid for closing the filter housing, wherein the filter housing lid comprises a second connection means,
wherein the first connection means and the second connection means are formed by male-female portions, wherein the male portion is formed on the filter housing lid and the female portion is formed on the filter insert, the female portion comprises a wall portion with at least one radial opening for receipt of the male portion extending from the lid to allow a relative axial movement between the filter insert and the filter housing lid for only a predetermined first distance, and wherein sections of the wall portion at opposite ends of the radial opening in the axial direction defines axially spaced stops for limiting the relative axial movement between the filter insert and the filter housing lid to the predetermined first distance, and are arranged to prevent a relative rotational movement between the filter insert and the filter housing lid by a tight fit circumferentially.

13. A filter arrangement according to claim 12, wherein the first and second connection means are arranged to allow a relative axial movement between the filter insert and the filter housing lid for only the predetermined first distance when they are engaged.

14. A filter arrangement according to claim 13, wherein one of the first connection means and the second connection means comprises axially spaced stops for limiting the relative axial movement between the filter insert and the filter housing lid to the predetermined first distance.

15. A filter arrangement according to claim 12, wherein the first connection means and the second connection means are arranged for a snap connection between the filter insert and the filter housing lid.

16. A filter arrangement according to claim 12, wherein the first connection means and the second connection means are arranged for a releasable connection.

17. A filter arrangement according to claim 12, wherein the filter arrangement further comprises the filter housing for receipt of the filter insert, wherein the filter insert comprises a first retaining means and the filter housing comprises a second retaining means, which are arranged for engagement with each other and wherein the second retaining means are arranged for guiding the filter insert in relation to the filter housing.

18. A filter arrangement according to claim 17, wherein one of the first retaining means and the second retaining means has a first section adapted for guiding the filter insert along a path, which has an axial component and a circumferential component relative to the filter housing.

19. A filter arrangement according to claim 18, wherein the first section of at least one of the first retaining means and the second retaining means forms a threaded structure.

20. A filter arrangement according to claim 19, wherein the other one of the first retaining means and the second retaining means forms a projection for receipt in the threaded structure.

21. A filter arrangement according to claim 18, wherein the first section has a first pitch.

22. A filter arrangement according to claim 18, wherein the one of the first retaining means and the second retaining means, which has the first section has a second section in communication with the first section for guiding the filter insert in a circumferential path with substantially no pitch.

23. A filter arrangement according to claim 17, wherein the first retaining means is positioned axially spaced from the first connection means.

24. A filter arrangement according to claim 17, wherein one of the first retaining means and the second retaining means is formed by at least one radially extending projection and the other of the first retaining means and the second retaining means is formed by an inclined surface.

25. A filter arrangement according to claim 17, wherein the filter insert comprises a central hollow support column and wherein the first connection means forms a first part of the support column and the first retaining means forms a second part of the support column.

26. A filter arrangement according to claim 17, wherein the first retaining means is arranged at a circumference of the filter material body.

27. A filter arrangement according to claim 17, wherein the filter housing lid comprises a first fastening means and the filter housing comprises a second fastening means, which are arranged for engagement with each other for removably fastening the filter housing lid to the filter housing.

28. A filter arrangement according to claim 27, wherein the first fastening means ft and the second fastening means are arranged to allow a relative axial movement between the filter housing lid and the filter housing a predetermined second distance during engagement of the first fastening means and the second fastening means.

29. A filter arrangement according to claim 28, wherein at least one of the first fastening means and the second fastening means forms a threaded structure.

30. A filter arrangement according to claim 27, wherein at least one of the first fastening means and the second fastening means have a pitch to allow a relative axial movement between the filter housing lid and the filter housing.

31. A filter arrangement according to claim 21, wherein the filter housing lid comprises a first fastening means and the filter housing comprises a second fastening means, which are arranged for engagement with each other for removably fastening the filter housing lid to the filter housing, wherein at least one of the first fastening means and the second fastening means have a second pitch to allow a relative axial movement between the filter housing lid and the filter housing, and the first pitch is higher than the second pitch so as to control movement of the filter insert relative to the filter housing lid when the first connection means is in engagement with the second connection means and the first retaining means is in engagement with the second retaining means.

* * * * *